US012008875B1

(12) United States Patent
Subramanian et al.

(10) Patent No.: US 12,008,875 B1
(45) Date of Patent: Jun. 11, 2024

(54) REMOTE TRIGGER FOR SECURITY SYSTEM

(71) Applicant: WALGREEN CO., Deerfield, IL (US)

(72) Inventors: Kartik Subramanian, Chicago, IL (US); Andrew David Schweinfurth, Chicago, IL (US); Raymond Kim, Chicago, IL (US); Bryan Anderson, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 17/982,194

(22) Filed: Nov. 7, 2022

Related U.S. Application Data

(63) Continuation of application No. 17/148,312, filed on Jan. 13, 2021, now Pat. No. 11,495,104, which is a continuation of application No. 16/809,200, filed on Mar. 4, 2020, now Pat. No. 10,964,185, which is a continuation of application No. 16/379,506, filed on Apr. 9, 2019, now Pat. No. 10,607,465, which is a continuation-in-part of application No. 16/268,268, filed on Feb. 5, 2019, now Pat. No. 10,438,469, which is a continuation of application No. 16/184,698, filed on Nov. 8, 2018, now Pat. No. 10,593,179, which is a continuation of application No. 15/689,469, filed on (Continued)

(51) Int. Cl.
*G08B 13/14* (2006.01)
*G07C 9/00* (2020.01)
*G08B 13/24* (2006.01)
*H04L 67/306* (2022.01)

(52) U.S. Cl.
CPC ..... *G08B 13/2454* (2013.01); *G07C 9/00309* (2013.01); *G07C 9/00571* (2013.01); *H04L 67/306* (2013.01)

(58) Field of Classification Search
CPC ............ G08B 13/2454; G07C 9/00309; G07C 9/00571; H04L 67/306
USPC ...................................................... 340/572.1
See application file for complete search history.

(56) References Cited

U.S. PATENT DOCUMENTS 6,885,281 B2 * 4/2005 McGunn ................ E05F 15/77
340/5.5
6,999,825 B2 * 2/2006 Inomata .................. G07F 17/13
340/5.73

(Continued)

*Primary Examiner* — Tai T Nguyen
(74) *Attorney, Agent, or Firm* — MARSHALL, GERSTEIN & BORUN LLP; Randall G. Rueth

(57) ABSTRACT

Techniques for automatically securing receptacles of a retailer via an electronic lock include receiving a user request to reserve a receptacle, selecting a suitable receptacle based on one or more conditions, some of which may be specified by the user, and transmitting an electronic locking signal to secure, and thereby reserve, the selected receptacle. An association between the reserved receptacle and the user is stored, and the user is electronically notified. Subsequently, an electronic signal indicative of the identification of the user (or of the user's agent) is locally received. Upon determination that the user is expected and associated with the reserved receptacle, the techniques include causing an electronic unlocking signal to be transmitted to the electronic lock, thereby unlocking the receptacle. Further subsequently, upon receiving an electronic locking instruction, the receptacle may automatically be secured via its corresponding electronic lock, and a retailer agent may be electronically notified.

18 Claims, 13 Drawing Sheets

Related U.S. Application Data

Aug. 29, 2017, now Pat. No. 10,192,417, which is a continuation of application No. 15/194,725, filed on Jun. 28, 2016, now Pat. No. 9,779,603.

(56) References Cited

U.S. PATENT DOCUMENTS

| | | |
|---|---|---|
| 7,275,864 B1 * | 10/2007 | Thompson ............. G01K 1/024 73/146 |
| 7,552,467 B2 * | 6/2009 | Lindsay ................ G07F 7/1025 713/168 |
| 8,943,187 B1 | 1/2015 | Saylor |
| 9,536,236 B2 | 1/2017 | Hay |
| 9,710,987 B2 | 7/2017 | Scoggins et al. |
| 9,779,603 B1 | 10/2017 | Subramanian et al. |
| 10,192,417 B1 | 1/2019 | Subramanian et al. |
| 11,195,355 B1 * | 12/2021 | Goetz ................. G07C 9/00309 |
| 2002/0080030 A1 * | 6/2002 | Inomata .............. G07F 17/0014 340/542 |
| 2003/0040980 A1 | 2/2003 | Nakajima et al. |
| 2004/0246130 A1 | 12/2004 | Lambright et al. |
| 2006/0250235 A1 | 11/2006 | Astrin |
| 2007/0176739 A1 | 8/2007 | Raheman |
| 2012/0038550 A1 | 2/2012 | Lemmey et al. |
| 2014/0085089 A1 | 3/2014 | Rasband et al. |
| 2015/0179035 A1 | 6/2015 | Christianson et al. |
| 2015/0371187 A1 | 12/2015 | Irwin et al. |
| 2016/0005284 A1 | 1/2016 | Batra et al. |
| 2016/0110975 A1 | 4/2016 | Oppenheimer |

* cited by examiner

REMOTE TRIGGER FOR SECURITY SYSTEM

CROSS-REFERENCE TO RELATED APPLICATIONS

This application is a continuation of U.S. application Ser. No. 17/148,312 filed Jan. 31, 2021 (which issued as U.S. Pat. No. 11,495,104 on Nov. 8, 2022) and entitled "REMOTE TRIGGER FOR SECURITY SYSTEM," which is a continuation of U.S. application Ser. No. 16/809,200 filed Mar. 4, 2020 (which issued as U.S. Pat. No. 10,964,185 on Mar. 30, 2021) and entitled "REMOTE TRIGGER FOR SECURITY SYSTEM," which is a continuation of U.S. application Ser. No. 16/379,506, filed Apr. 9, 2019 (which issued as U.S. Pat. No. 10,607,465 on Mar. 31, 2020) and entitled "REMOTE TRIGGER FOR SECURITY SYSTEM," which is a continuation-in-part of U.S. application Ser. No. 16/268,268, filed Feb. 5, 2019 (which issued as U.S. Pat. No. 10,438,469 on Oct. 8, 2019) and entitled "REMOTE TRIGGER FOR SECURITY SYSTEM," which is a continuation of U.S. application Ser. No. 16/184,698, filed Nov. 8, 2018 (which issued as U.S. Pat. No. 10,593,179 on Mar. 17, 2020) and entitled "REMOTE TRIGGER FOR SECURITY SYSTEM," which is a continuation of U.S. application Ser. No. 15/689,469, filed Aug. 29, 2017 (which issued as U.S. Pat. No. 10,192,417 on Jan. 29, 2019) and entitled "REMOTE TRIGGER FOR SECURITY SYSTEM," which is a continuation of U.S. application Ser. No. 15/194,725, filed Jun. 28, 2016 (which issued as U.S. Pat. No. 9,779,603 on Oct. 3, 2017) and entitled "REMOTE TRIGGER FOR SECURITY SYSTEM," the entire disclosures of which are incorporated herein by reference.

TECHNICAL FIELD

This application generally relates to mitigating or preventing retail theft. In particular, this application relates to automatically and/or triggering the remote locking and unlocking of receptacles for customer access.

BACKGROUND

Presently, in certain retail locations, specific products are secured to help deter or prevent theft. Items may be stored in locked receptacles, or items may be individually secured to a receptacle, such as a container, bin, shelf, rack, or other object. For example, battery-operated shaving razors and higher-end cosmetics may be housed within locked receptacles. If a customer would like to examine and/or purchase an item that is secured at such a receptacle, the customer must find a store manager or associate to physically unlock the item so that the customer is able to physically examine the product. If the customer desires to purchase the product, he or she takes it up to the register to complete the transaction. Irrespective of whether or not the customer purchases the product, the store manager or associate must physically re-secure the receptacle or the other items at the receptacle.

Portable electronic devices such as smart phones and tablet devices are becoming more ubiquitous as underlying technology and device capability improves. These devices incorporate numerous components that support various device functions and applications. For example, current smart phones include components that enable network connections as well as location modules capable of detecting device location.

SUMMARY

In an embodiment, a method for mitigating retail theft includes determining an identity of a customer based on a wireless transmission delivered directly between a personal electronic device (PED) of the customer and a transceiver at or corresponding to a receptacle at which an item is secured via an electronic lock. For example, the customer's PED may automatically discover a beacon signal being transmitted by a transceiver corresponding to the receptacle and/or to the secured item, and the customer's PED may automatically establish a wireless connection with the transceiver. Alternatively, the customer's PED may alert the customer to the discovered beacon, and the customer may manually instruct the PED to request the remote unlocking of the electronic lock, e.g., via the establishment of a wireless connection with the transceiver. The customer's identity may be determined based on information included in the header and/or the payload of the wireless transmission, for example.

Based on the determined customer identity, a risk profile of the customer may be accessed, and a risk score corresponding to the customer accessing the secured item may be determined based on the risk profile (and, optionally, based on a profile of the item secured at the receptacle). The method may include determining whether or not the risk score is indicative of an acceptable risk. If the risk is determined to be acceptable, the method may include automatically sending an electronic signal to trigger the remote unlocking of the electronic lock, thereby remotely causing the item to be unsecured for access by the customer. If the risk is determined to be unacceptable, the method may include sending an electronic signal to a device operated by an agent of the retailer or enterprise providing the item, and the agent may then manually unsecure the item so that the customer is provided access to the item in the presence of the agent. Alternatively, the agent may choose to send an electronic signal from his or her device to remotely trigger the remote unlocking of the electronic lock, and thereby may remotely cause the item to be unsecured for access by the customer.

In an embodiment, a system for mitigating retail theft includes a wireless transceiver disposed at or in the proximity of a receptacle, and an electronic lock that secures an item within, at, or to the receptacle. Additionally, the system includes a security system to which the wireless transceiver and electronic lock are communicatively connected. The security system may include one or more data storage entities that store a plurality of risk profiles corresponding to a plurality of customers of an enterprise or retailer that provides the secured item. The security system may generate an electronic signal corresponding to unlocking the electronic lock based on a risk score corresponding to a particular customer accessing the secured item. The identity of the particular customer may be determined automatically based on a wireless transmission delivered between a Personal Electronic Device (PED) of the customer and the wireless transceiver.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1A:
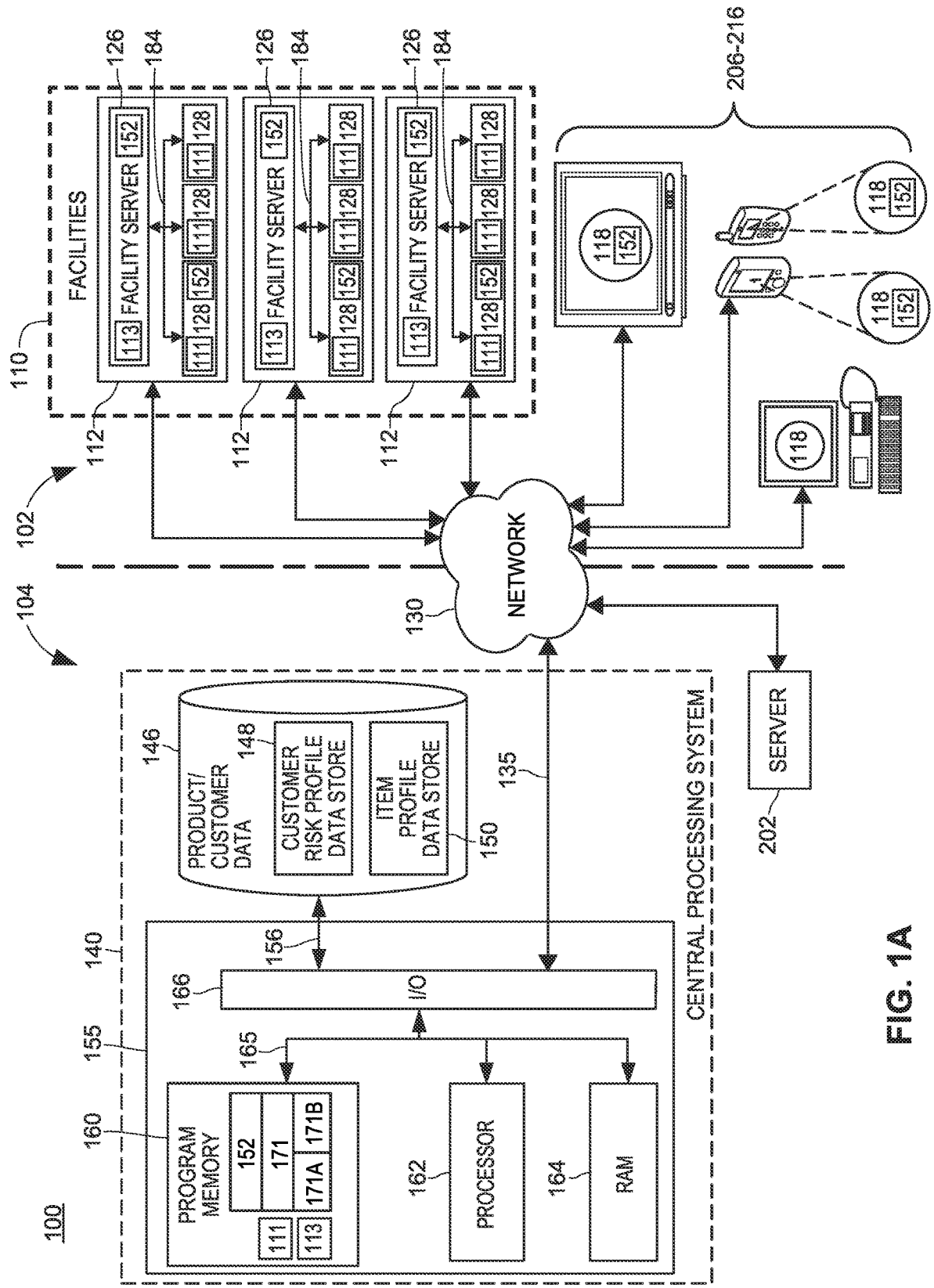
FIGS. 1A-1D illustrate various front end and back end devices and components of an example system for mitigating retail theft, and connections therebetween, in accordance with some embodiments.

The systems, methods, and techniques disclosed herein relate generally to mitigating and/or preventing retail theft. In particular, the systems, methods, and techniques disclosed herein relate to the automatic and/or remote trigger of the unlocking of a secured item, e.g., that is disposed within a locked receptacle, so that a customer may examine and/or access the item. According to certain aspects, the systems and methods may leverage communications and other hardware and software capabilities of electronic devices to provide the automatic and/or remote unlocking of secured items while simultaneously mitigating the risk to a retailer or enterprise.

In an embodiment, a wireless transceiver or equivalent (e.g., a transmitter and receiver pair) may be disposed on, near, proximate to, or at a secured item. The secured item may be provided by an enterprise or a retailer, and may be an item that is offered for sale. The item may be secured via an electronic lock in any number of ways. For example, the item may be housed within a receptacle, typically along with other inventory, and an opening or door of the receptacle may be secured or locked by the electronic lock. In another example, the item may be individually secured to a receptacle (which may be a container, bin, shelf, rack, or some other object) via an electronic lock. The wireless transceiver may be disposed on, at, or proximate to the secured item or receptacle. For example, the wireless transceiver may be fixedly attached to the item, to the receptacle, or to some other object within the vicinity of the secured item.

Generally speaking, the wireless transceiver is configured to wirelessly communicate with any known wireless computing devices, such as smart phones, tablets, laptops, and/or personal electronic devices ("PEDs"). For example, the wireless transceiver may be configured to operate using any number of known common air interface protocols, such as cellular communication protocols (e.g., GSM, CDMA, PCS, LTE, etc.), wireless networking protocols (e.g., Wi-Fi and/or other IEEE 802.11 protocols, etc.), short-range communication protocols (e.g., Bluetooth, infrared communication, Zigbee, etc.), and any other known wireless protocol utilized by personal electronic devices. Further, the wireless transceiver is positioned, disposed, located, and/or configured so that it has the ability to receive wireless signals over any one or more of these common air interface protocols from a personal electronic device when the PED is the vicinity or proximity of the secured item. A wireless signal that is detected or received by the wireless transceiver may have been automatically generated by a PED, for example, as a result of the PED and the wireless transceiver automatically discovering each other via Bluetooth or some other suitable discovery protocol. Additionally or alternatively, a wireless signal that is detected or received by the wireless transceiver may have been generated manually at a PED, e.g., upon a user's activation of a user control at the PED in response to being notified that the PED is within proximity of the transceiver, and therefore within proximity of the secured item.

A wireless signal that is received at a transceiver corresponding to a secured item may include contents that are indicative of a particular customer of the retailer or enterprise. For example, the wireless signal may include an identification of the PED, an identification of the customer, an identification of an account that the customer has with the retailer or enterprise, and/or an identification of an application that is executing on the PED and that corresponds to the retailer or enterprise. The particular customer's identity may be utilized to access the customer's risk profile, which may include data corresponding to previous interactions that a particular customer has had with the retailer or enterprise. The data stored in the particular customer's risk profile may in turn be utilized to determine a risk score corresponding to the particular customer accessing the secured item. If the risk score indicates an acceptable risk, the item may be automatically and remotely unsecured (e.g., the electronic lock may be automatically and remotely unlocked) so that the particular customer is able to access and handle the item. On the other hand, if the risk score indicates an unacceptable risk, an agent of the retailer enterprise (e.g., an employee, a store associate, security personnel, etc.) may be notified so that the electronic lock may be manually unlocked for the particular customer in the presence of the agent. As such, the systems, methods, and techniques described herein allow a retailer enterprise to remotely permit access to a customer for high-value items/goods based on a risk profile of the customer, thereby decreasing the risk of theft as well as decreasing the length of time that a qualified customer must wait in order to access secured items, as will be described below.

Turning now to FIG. 1, FIG. 1 illustrates an overall system 100 including various components configured to implement various embodiments for mitigating the risk of retail theft. In particular, the system 100 may include various components configured to trigger the remote unlocking of secured receptacles in a manner that mitigates the risk of retail theft. The system 100 may include a combination of hardware and software components, as well as various data communication channels for communicating data between and among the various hardware and software components. The system 100 may be roughly divided into front-end components 102 and back-end components 104. At least one of the front-end components 102 may be primarily disposed within a retail network 110 that may include one or more physical retail stores 112 of an enterprise or retailer. The physical retail stores 112 may be located, by way of example rather than limitation, in separate geographic locations from each other, including different areas of the same city, different cities, or even different states. According to the present embodiments, each of the physical retail stores 112 may be a "brick and mortar" store that may include one or more physical buildings or structures, where each of the physical retail stores 112 may accommodate shoppers and customers. A brick and mortar store may be distinguished from a mail-order store of the retailer enterprise, and may be distinguished from an electronic store, on-line store, or website of the retailer or enterprise.

The front-end components 102 may include a number of workstations 128 or computing devices. The workstations 128 may be local computers located in the various physical retail stores 112 throughout the retail network 110 and may be capable of executing various applications. Retail store personnel or agents (not shown) may use the applications executing at the workstations 128 to, for example, access customer information, access images, enter payment information, and/or perform other data management functions associated with the physical retail stores 112.

Personal electronic devices (PEDs, also referred to herein as mobile devices or client devices) 206-216 (e.g., personal computers, cellular phones, smart phones, tablets, other handheld electronic devices, etc.) may be communicatively connected to the physical retail stores 112 and/or to the back end components 104 through one or more digital networks 130, as described below. The client devices 206-216 may, but need not be, disposed within the retail network 110. Further, particular ones of the client devices 206-216 may be operated by customers of the retailer or enterprise, while other ones of the client devices 206-216 may be operated by agents of the retailer or enterprise, e.g., as mobile instances of the workstations 128.

Those of ordinary skill in the art will recognize that the front-end components 102 may also comprise a plurality of facility servers 126 disposed at the plurality of physical retail stores 112 instead of, or in addition to, a plurality of workstations 128. In an example configuration, each of the physical retail stores 112 may include one or more facility servers 126 that may facilitate communications between the workstations 128 of the physical retail stores 112 via the digital network(s) 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 may also refer to the facility servers 126, and vice versa. Moreover, environments other than the physical retail stores 112 may employ the workstations 128 and the servers 126.

The front-end components 102 may communicate with the back-end components 104 via the digital communication network(s) 130. One or more of the front-end components 102 may be excluded from communicating with the back-end components 104 by configuration or by limiting access due to security concerns. For example, certain ones of the client devices 206-216 may be excluded from direct access or only provided with limited access to the back-end components 104. In some embodiments, the physical retail stores 112 may communicate with the back-end components via the digital network(s) 130. In other embodiments, the physical retail stores 112 and the client devices 206-216 may communicate with the back-end components 104 via the same portions of the digital network 130, but digital access rights, IP masking, and other network configurations may deny access to the client devices 206-216. In an embodiment, the network 130 may include respective, local wireless communication networks provided in or near the physical retail stores 112 via which client devices 206-216 may communicatively connect to other front-end components 102 and/or to the back-end components 104. The network 130 may additionally or alternatively support communicative connections between applications 118 executing on the devices 206-216 and the back-end components 104. For example, the applications 118 may include a web-browser and/or a downloaded retailer client application that may communicate with one or more back-end components 104 via the network 130.

The digital network(s) 130 may be a proprietary network, a secure public Internet, a virtual private network or some other type of network, such as dedicated access lines, plain ordinary telephone lines, satellite links, wireless links, wired links, combinations of these, etc. Where the digital network 130 comprises the Internet, data communication may take place over the digital network 130 via an Internet communication protocol. In addition to one or more servers 202 that are configured to communicate with client or front-end applications (e.g., as described below), the back-end components 104 may include the central processing system 140.

Of course, the physical retail stores 112 may be communicatively connected to different back-end components 104 having one or more functions or capabilities that are similar to the central processing system 140. The central processing system 140 may include one or more computer processors 162 adapted and configured to execute various software applications and components of the system 100, in addition to other software applications. The central processing system 140 may further include one or more databases 146. The database(s) 146 may comprise one or more data storage devices that are adapted to store data related to the operation of the system 100, such as product data and/or customer data. In particular, the database(s) 146 may store information associated with items/products and/or services that are available for sale in various ones of the physical retail stores 112. For example, the database(s) 146 may store locations of the items/products (e.g., aisle number or other information), pricing information, availability and inventory information, coupon(s) associated with the items/products and/or services, and more detailed information associated with the items/products and/or services (e.g., product descriptions). Additionally or alternatively, the database(s) 146 may store information related to various customers or users associated with the retailer, e.g., user accounts. The central processing system 140 may access data stored in the database(s) 146 when executing various functions and tasks associated with the operation of the system 100. The central processing system 140 may also maintain and update the data stored in the database(s) 146. For example, the central processing system 140 may generate coupons for the items/products and/or services, update availability and inventory information (such as if a certain product is purchased from one of the physical retail stores 112), and/or update passwords, user preferences, and default payment methods for various users.

To support the mitigation of the risk of retail theft at the physical retail stores 112, the databases(s) 146 may include a customer risk profile data store 148 and an item profile data store 150. The customer risk profile store 148 may store therein customer-specific data that is or may be indicative of whether or not a particular customer is associated with an increased level of risk to the retailer or enterprise. As such, a particular customer's risk profile that is stored in the risk profile store 148 may include data corresponding to the customer's on-line browsing habits, purchases, returns, and/or other electronic interactions with the enterprise or retailer, and the particular customer's risk profile may include data corresponding to the customer's bricks-and-mortar storefront purchases, returns, and/or other interactions with the enterprise or retailer at retail store locations. For example, a particular customer's risk profile may include data indicative of whether or not the customer has a past history of unpaid items, whether or not the customer has a past history of returning items, whether or not a customer has had a check returned with insufficient funds, etc. The item profile store 150 may store therein item-specific data that is indicative of whether or not a particular item is associated with increased level of risk. For example, a particular item profile stored in the item profile store 150 may include data indicative of the value of the particular item, whether or not the particular item has a history of being shoplifted or stolen, etc.

With regard to the database(s) 146, it should be appreciated that additional data and additional techniques for maintaining and updating the data are appreciated. It should also be appreciated that although the database(s) 146 is shown as a single entity in FIG. 1A, the database 146 may be implemented using any one or more databases and any one or more data storage devices. For example, the database(s) 146 may be implemented by a data bank or a data cloud.

Further, although FIG. 1A depicts the system 100 as including the central processing system 140 in communication with three physical retail stores 112 and various client devices 206-216, it should be understood that different numbers of processing systems, retail stores, and devices may be utilized. For example, the digital network(s) 130 (or other digital networks, not shown) may interconnect the central processing system 140 to a plurality of included central processing systems 140, hundreds of physical retail stores 112, and thousands of client devices 206-216. According to the disclosed example, this configuration may provide several advantages, such as, for example, enabling near real-time uploads and downloads of information as well as periodic uploads and downloads of information. This may provide for a primary backup of all the information generated in supported functionalities. Alternatively, some of the physical retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a program memory 160, the processor 162 (which may be called a microcontroller or a microprocessor), a random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain or be configured with machine-readable instructions (i.e., software) 171, for execution by the processor 162. The software 171 may perform the various tasks associated with operation of the retail stores, and may be a single module 171 or a plurality of modules 171A, 171B. While the software 171 is depicted in FIG. 1A as including two modules, 171A and 171B, the software 171 may include any number of modules accomplishing tasks related to retail store operation. The central processing system 140 may implement a server application 113 for providing data to a user interface application 111 operating on the workstations 128.

Further, although FIG. 1A illustrates the central processing system 140 as including only one controller 155, it is understood that this is for ease of illustration and is not meant to be limiting. Indeed, in some embodiments of the system 100, the central processing system 140 may be implemented using multiple controllers 155 that have a unitary or integral logical appearance. For example, the central processing system 140 may be implemented as a bank of servers or on a computing cloud.

As shown in FIG. 1A, the system 100 for mitigating the risk of retail theft may include one or more security modules 152. Typically, each facility server 126 may include a respective security module 152. However, in some implementations, security modules 152 may be disposed at the front end 102 in one or more workstations 128 and/or in one or more client devices 206-216, e.g., as a portion of a client application provided by the retailer or enterprise or as a separate application 118. In some implementations, security modules 152 may be disposed at the back end 104 at the central processing system 140, e.g., as a portion of a server application or as a separate application 113, and/or as one of the software modules 171. Some security modules 152 each may be disposed at a single location or device. Some security modules 152 each may be disposed across multiple locations and/or devices, such as when a particular instance of a security module 152 is instantiated by a first portion downloaded onto a client device 206-216 and a second portion executing at a facility server 126. Generally speaking, the one or more security modules 152 included in the system 100 may operate in conjunction with the risk profile store 148 (and optionally the item profile store 150) to mitigate the risk of retail theft at brick-and-mortar retail store locations 112, as will be described in more detail in later sections. Accordingly, the one or more security modules 152, the risk profile store 148, and optionally the item profile store 150 may comprise a security system or security subsystem included in the system 100 for mitigating the risk of retail theft. Of course, other components illustrated in and/or discussed with respect to FIGS. 1A-1D may also be included in the security system or security subsystem, in some embodiments.

Figure 1B:
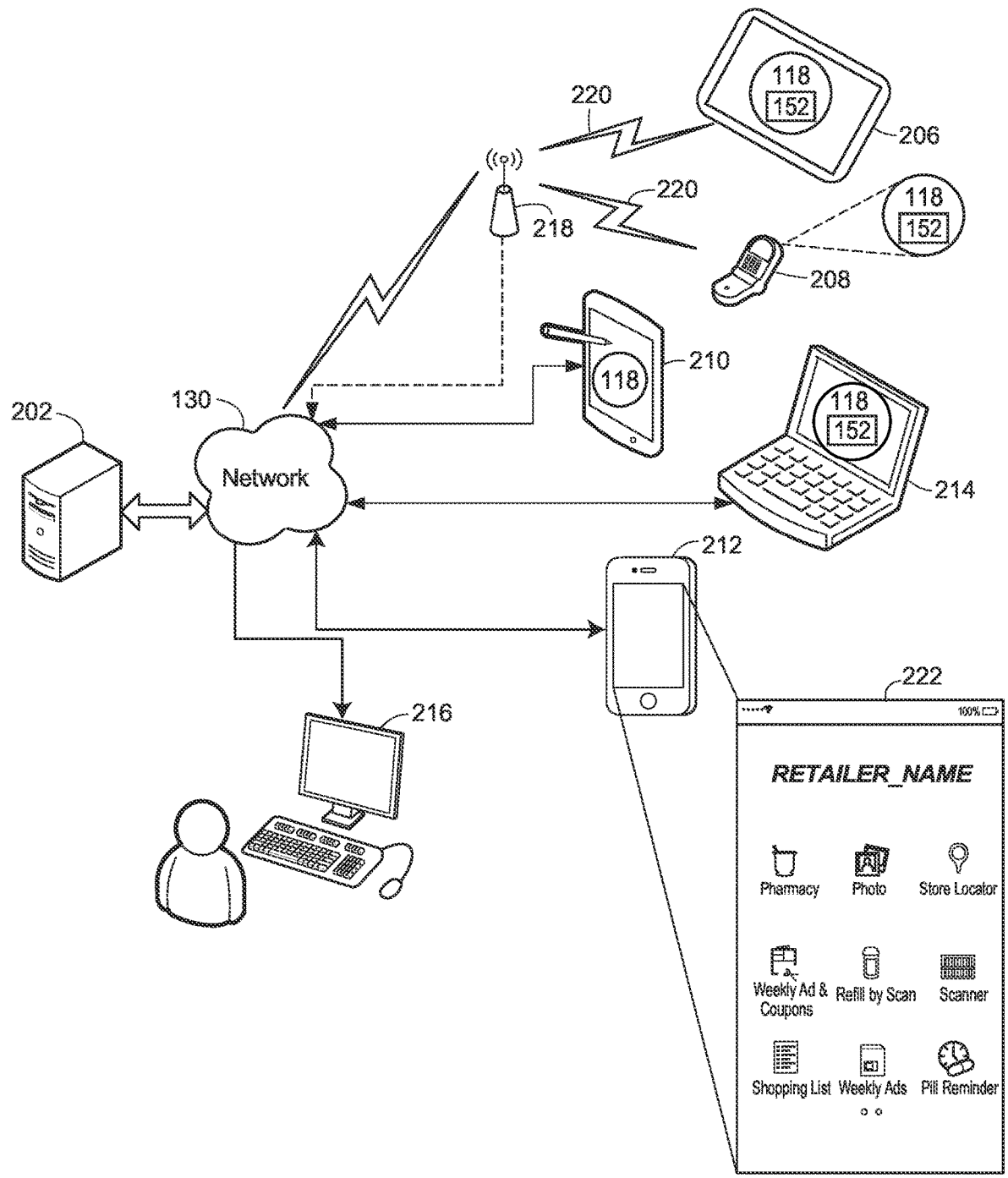
Figure 1C:
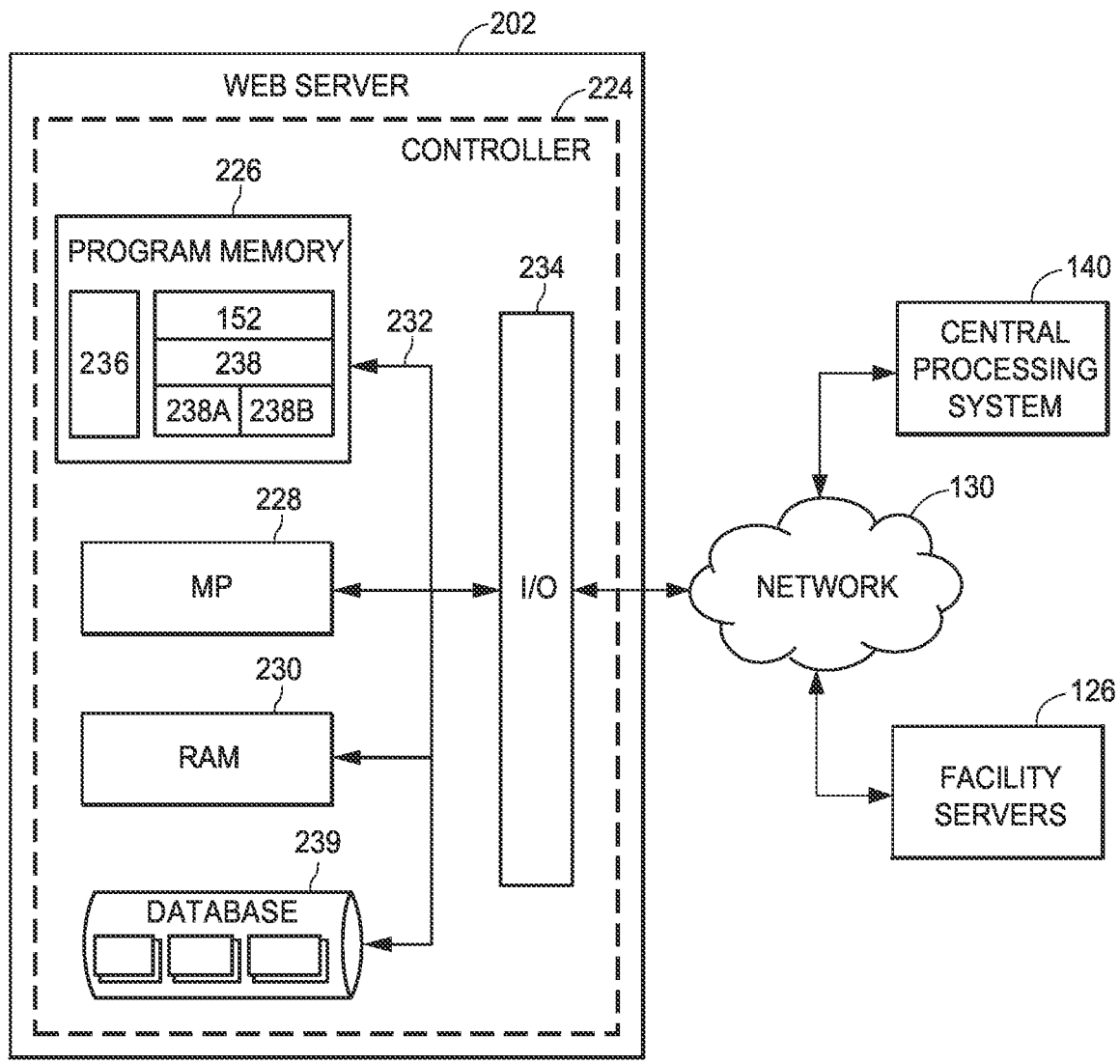

At any rate, for purposes of implementing the system 100, a user may interact with the server 202 and the retail store systems (e.g., the central processing system 140, the facility servers 126, the workstations 128, etc.) via one of the client devices 206-216 via a mobile device application, a specialized application, or one or more web pages 118. In an example, FIG. 1B depicts the server 202 connected via the network 130 to the client devices 206-216 executing or running applications 118 through which a user may initiate and interact with the system 100 (as shown in FIG. 1A). The client devices or PEDs 206-216 may include, by way of example, a tablet computer 206, an internet-enabled cell phone 208, a personal digital assistant (PDA) 210, a smart phone 212, a laptop computer 214, a desktop computer 216, a portable media player (not shown), and/or others. Further, each application 118 executing on its respective host device 206-216 may be a web browser, a client application provided by the retailer or enterprise, or some other client application via which a communicative connection or session may be established with the server 202, e.g., to access the electronic retail store of the retailer, and/or to access user account information. In an embodiment, one or more security modules 152 may be incorporated into a client application 118, or may be implemented as a stand-alone application or module 118 executing on the client device 206-216.

The client devices 206-216 need not necessarily communicate with the network 130 via a wired connection. In some instances, the client devices 206-216 may communicate with the network 130 via wireless signals 220 and, in some instances, may communicate with the network 130 via an intervening wireless or wired device 218, which may be a wireless router, a wireless repeater, a wireless access point, a base transceiver station of a mobile telephony provider, etc. Each of the client devices 206-216 may interact with the server 202 to receive web pages or server data from the server 202 and may display the web pages or server data via its respective client application 118 (described below). For example, the mobile device 212 may display a home screen 222 (i.e., the root or start page at which users enter the client application) of the retailer client application 118 to the user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the electronic retail store web interface, servicing different retailer client applications, etc. These multiple servers 202 may include a web server, an entity-specific server (e.g. an Apple® server, etc.), a server that is disposed in a retail or proprietary network, an independent third-party server that is not under the control of the entity, a bank of servers, a cloud computing platform, or others.

Turning now to FIG. 10, the server 202, like the facility server 126, may include a controller 224. Similar to the controllers 155 and 170, the controller 224 may include a program memory 226, a microcontroller or a microprocessor (MP) 228, a random-access memory (RAM) 230, and an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data that may be used to interact with the user through the network 130. According to embodiments, the database 239 may store the same or similar data as that stored by the database 146 as discussed with respect to FIG. 1A. For example, the database 239 may include at least a portion of the customer risk profile data store 148 and/or at least a portion of the item profile data store 150. Further, the database 239 may be implemented on one or more data storage devices.

As discussed with reference to the controllers 155 and 170, it should be appreciated that although FIG. 10 depicts only one microprocessor 228, the controller 224 may include multiple microprocessors 228. Similarly, the memory of the controller 224 may include multiple RAMs 230 and multiple program memories 226. Although the FIG. 10 depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the client devices 206-216, as depicted in FIG. 1B, FIG. 10 illustrates that the server 202 may also be connected through the network 130 to the central processing system 140 and/or one or more facility servers 126. As described below, the connection of the server 202 to the central processing system 140 may assist in facilitating various functionalities. As a result, the server 202 may act as a routing or interfacing server between the plurality of client devices 206-216 and a destination server, namely, the central processing system 140. For example, the server 202 may be configured to communicate with the central processing system 140 and with the client devices 206-216 via a multitude of protocols, such as packet-switched protocols, web services, web APIs (Application Programming Interface), etc. The server 202 may also convert (if necessary) and route client application data (not shown) to the appropriate server, such as the central process system 140 for example. Additionally, the server 202 may act as the destination server and need not route any data from the internet-enabled device 206-216.

As shown in FIG. 10, the program memory 226 and/or the RAM 230 may store various applications for execution by the microprocessor 228. For example, a user-interface application 236 may provide a user interface to the server 202, which user interface may, for example, enable a network administrator to configure, troubleshoot, or test various aspects of the server's operation, or otherwise to access information thereon. A server application 238 may operate to populate and transmit client application data and web pages to the client devices 206-216, receive information from the user transmitted back to the server 202, and forward appropriate data to the central processing system 140 and the facility servers 126.

Like the software 171 of FIGS. 1A and 1B, the server application 238 may be a single module 238 or a plurality of modules 238A, 238B. While the server application 238 is depicted in FIG. 10 as including two modules, 238A and 238B, the server application 238 may include any number of modules that may facilitate tasks related to the implementation of the server 202. By way of example, the module 238A may populate and transmit the client application data and/or may receive and evaluate inputs from the user to receive a data access request, while the module 238B may communicate with one or more of the back end components 104 to fulfill a data access request. In an embodiment, one or more security modules 152 may be incorporated into a server application 238, or may be implemented as a stand-alone application or module 238.

Figure 1D:
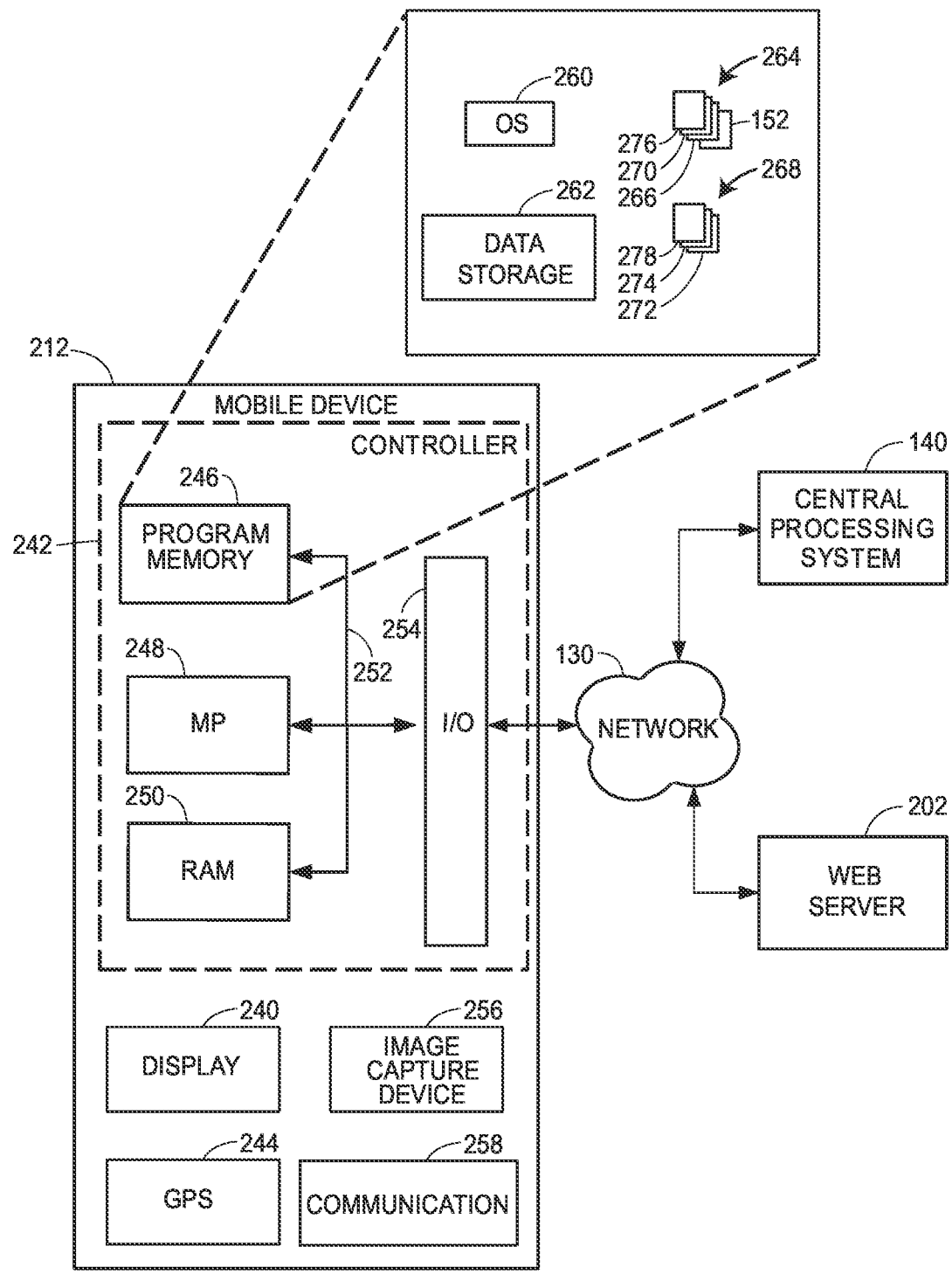

Referring now to FIG. 1D, the mobile device 212 (or any of the client devices 206-216) may include a display 240, a Global Positioning System (GPS) unit 244 (which may include respective one or more sensors), a communication unit 258 (which may include respective one or more interfaces and/or transceivers, at least some of which may be wireless), an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which may be interconnected via an address/data bus 252.

The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 262 may include data such as user profiles, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that may reside within the mobile device 212.

The GPS unit 244 may use "Assisted GPS" (A-GPS), satellite GPS, or any other suitable global positioning protocol, transceivers, sensors, or system that locates the position of the mobile device 212. For example, A-GPS utilizes terrestrial cell phone towers or Wi-Fi hotspots (e.g., wireless router points) to more accurately and more quickly determine location of the mobile device 212 while satellite GPS generally may be more useful in more remote regions that may lack cell towers or Wi-Fi hotspots. The communication unit or module 258 may communicate with the server 202 and other devices via one or more transceivers that support any one or more suitable wireless communication protocol network or networks, such as a wireless cellular telephony network (e.g., GSM, CDMA, LTE, etc.), a WLAN network (or other similar network according to 802.11 standards), a WiMAX network, a short-range wireless communication network (e.g., Bluetooth, Zigbee, infrared, etc.), and/or others.

The image capture device 256 may be a built-in camera within the mobile device 212 or may be an external camera, such as a webcam, that is communicatively coupled with the mobile device 212 (or any other internet-enabled device 206-216). The user-input device or generally a user interface (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user interface (which may include the display 240) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In embodiments, the display 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™ that may be implemented as a series of machine-readable instructions for receiving, interpreting, and displaying web page information from the server 202, the facility servers 126, or the server applications 113 while also receiving inputs from the user.

Another application of the plurality of applications 264 may include a location awareness application 276 that may be implemented as a series of machine-readable instructions for receiving, interpreting, and displaying location information of the mobile device 212 (or any other internet-enabled device 206-216), e.g., as determined based on information detected or determined by the GPS unit 244 and/or by the communication unit or module 258. One of the plurality of routines 268 may include an image capture routine 272 that coordinates with the image capture device 256 to retrieve image data for use with one or more of the plurality of applications, such as the client application 266, or for use with other routines. Another routine in the plurality of routines 268 may include an image display routine 274 that receives and interprets image data of any type or format for display. Likewise, the image display routine 274 may coordinate with the image capture routine 272 to obtain image data and process the image data into a displayable format for use with the client application 266.

Yet another application of the plurality of applications 264 may include a client application 266 that allows a user to interact with the enterprise or retailer, either electronically and/or to enhance the customer's retail experience within a bricks-and-mortar store. The customer or user may launch the client application 266 from an internet-enabled device, such as one of the client devices 206-216, to access the server 202 cooperating with the central processing system 140 and the retail network 110. Additionally, the customer or the user may also launch or instantiate any other suitable user interface application 118 (e.g., the web browser 270, or any other one of the plurality of software applications 264) to access the server 202, the facility servers 126, or the server applications 113. Generally, the term "user" is used when referring to a person who is operating one of the client devices 206-216 and is not exclusive of the term "customer." For example, multiple users may utilize a particular customer's account, such as when children utilize their parent's account. As described above, one or both of the databases 146 and 239, illustrated in FIGS. 1A and 10, respectively, may include various information about the retail store's customers, as well as basic biographical information about the customer, such as a customer name, a customer address, a customer phone number, coupons redeemed by the customer, and the like. Customer account records are among the exemplary data that the system 100 may store on the databases 146 and 239.

In an embodiment, the client application 266 may include a security module 152 that operates in conjunction with the client application 266 to mitigate the risk of retail theft for the enterprise or retailer. In other embodiments, the security module 152 may be implemented as a separate application 264 which may or may not be in communicative connection with the client application 266.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 248 (e.g., working in connection with the operating system 260) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 2:
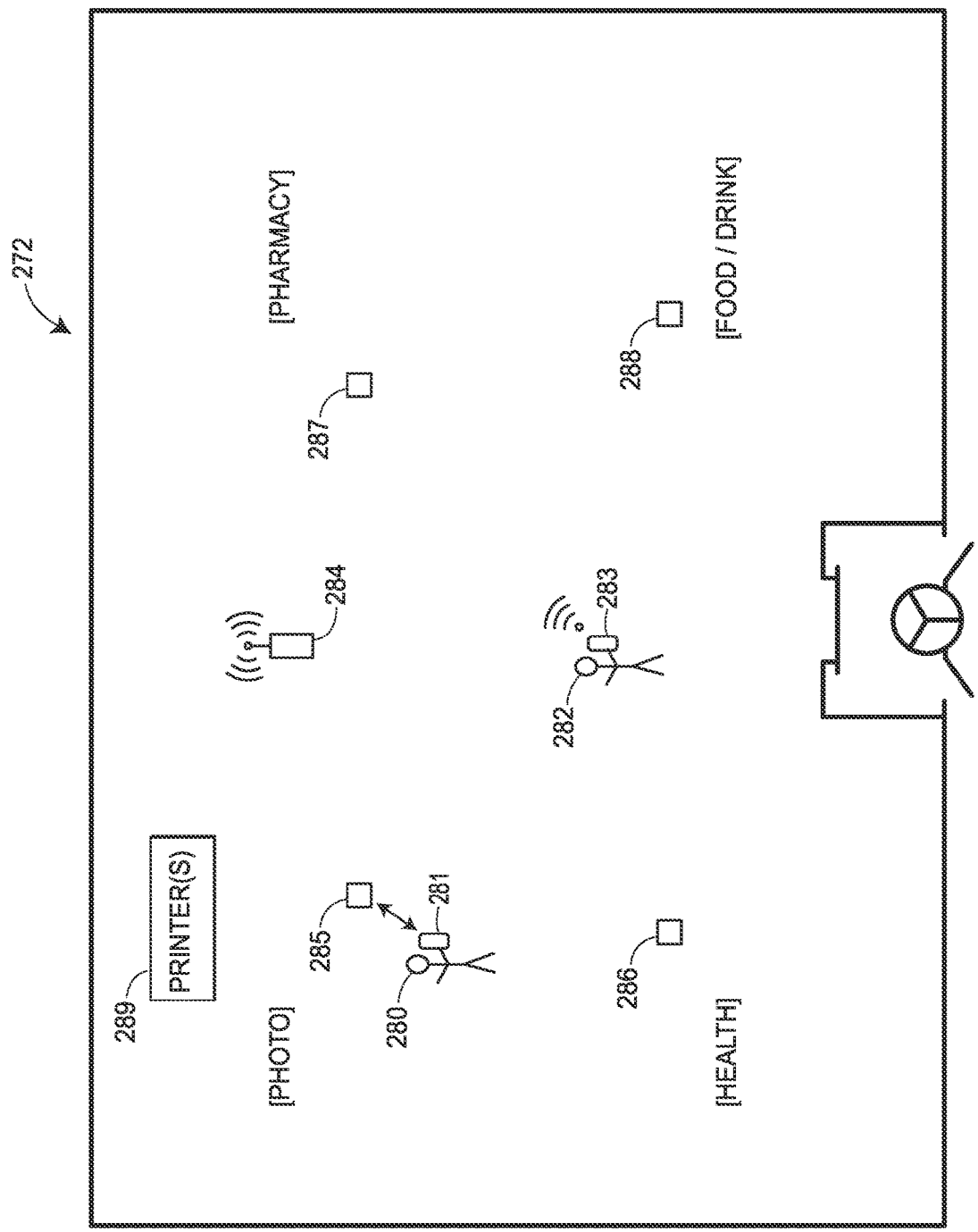
FIG. 2 depicts an example layout of an example physical retail store of a retailer or enterprise.

Referring now to FIG. 2, FIG. 2 depicts an example layout of an example physical retail store 272 of a retailer or enterprise (such as the physical retail store 112 as described with respect to FIG. 1A). In the example depicted in FIG. 2, the physical retail store 272 may include different departments or sections (as shown: photo, pharmacy, health, and food/drink); however it should be appreciated that other types of retail stores and general environments are envisioned. Each of the different departments or sections may include various components, devices, or the like. For example, as depicted in store 272, the photo section may include one or more printers 289 that may be configured to print digital images.

Customers or users 280, 282 may enter the retail store, browse in the various departments or sections, and/or purchase any desired items/products or services. Each of the customers 280, 282 may be equipped with a respective electronic device 281, 283 (such as one of the client devices 206-216 as described with respect to FIG. 1A). Each electronic device 281, 283 may be any type of portable electronic device, for example, a notebook computer, a tablet, a mobile phone, a Personal Digital Assistant (PDA), a smart phone, a tablet computer, a multimedia player, an MP3 or MP4 player, a digital or analog broadcast receiver, a remote controller, or any other electronic apparatus.

According to embodiments, the physical retail store 272 may support various wireless local area networks (WLAN) and/or wireless personal area networks (WPAN) to which the electronic devices 281, 283 may connect, either in a secured or unsecured manner. In an embodiment, one or more wireless local area networks and/or wireless personal area networks that are accessible within or near the physical retail store may be included in the network 130 of FIG. 1. In one particular implementation, the physical retail store 272 may include one or more wireless access points (AP) 284 to which the electronic devices 281, 283 may connect, e.g. via a suitable transceiver and a WLAN connection. Accordingly, when the electronic devices 281, 283 are connected to the AP 284, the electronic devices 281, 283 may be connected to the local area network implemented within the physical retail store 272 (i.e., the physical retail store 272 may be a "hotspot" and/or may provide Wi-Fi connectivity to the devices 281, 283).

The physical retail store 272 may also be configured with a plurality of transmitters or transceivers 285, 286, 287, 288 (e.g., "beacons") that may be disposed throughout the area of the physical retail store 272. Although FIG. 2 depicts the physical retail store 272 supporting four (4) transmitters 285-288, it should be appreciated that the physical retail store 272 may support fewer or additional transmitters. The plurality of transmitters 285-288 may be disposed in various locations of the physical retail store 272. Each of the plurality of transmitters 285-288 may be secured to various components of the physical retail store 272 (e.g., shelves, ceiling, receptacles, containers, doors, etc.). Each of the plurality of transmitters 285-288 may include any combination of hardware and software components, including a module for transmitting or broadcasting signals. Further, each of the plurality of transmitters 285-288 may be configured to be powered by a battery or via another power source.

According to embodiments, each of the plurality of transmitters or transceivers 285-288 may support one or more short-range communication protocols as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Each of the plurality of transmitters 285-288 may also be configured to broadcast or transmit a signal that may include any stored data. In one embodiment, each of the plurality of transmitters 285-288 may continuously broadcast a signal that may include a unique identifier of the corresponding transmitter 285-288.

The signals that the transmitters or transceivers 285-288 broadcast may have an associated detection range depending on the type of communication protocol. Generally, Bluetooth® signals have a range of 100 meters and BLE (Bluetooth Low Energy) signals have a range of 50 meters. The detection range of the signal that the transmitters 285-288 broadcast may also vary and may be programmable. For example, the range of a first signal that is broadcast by the transmitter 285 may be fifteen (15) meters while the range of a second signal that is broadcast by the transmitter 286 may be twenty-five (25) meters.

When one of the electronic devices 281, 283 is within broadcast range of one of the transmitters/transceivers 285-288, the electronic devices 281, 283 can detect and receive the signal, e.g., via a suitable transceiver of the electronic device 281, 283. In particular, a communication module of the electronic devices 281, 283 that supports a short range communication protocol (e.g., a BLE chip) can detect and receive the signal. For example, FIG. 1 depicts an example communication module 258 which may be included in the device 281 and/or 283, and FIG. 2 depicts the electronic device 281 detecting the signal broadcast by the transmitter 285 via its communication module 258.

According to embodiments, the electronic devices 281, 283 (and any application executing thereon) may facilitate various features to mitigate the risk of retail theft when connected to various ones of the connections within the physical retail store 272. In particular, the electronic devices 281, 283 may detect one or more of the transmitters/transceivers 285-288, and/or may connect to (or may detect the availability of) the access point 284. Based on the electronic presence of the electronic devices 281, 283 within the physical retail store 272, the facility server 126 may in turn connect to an on-site server or a remote server to facilitate the mitigation of the risk of retail theft, as is described in more detail below.

Figure 3:
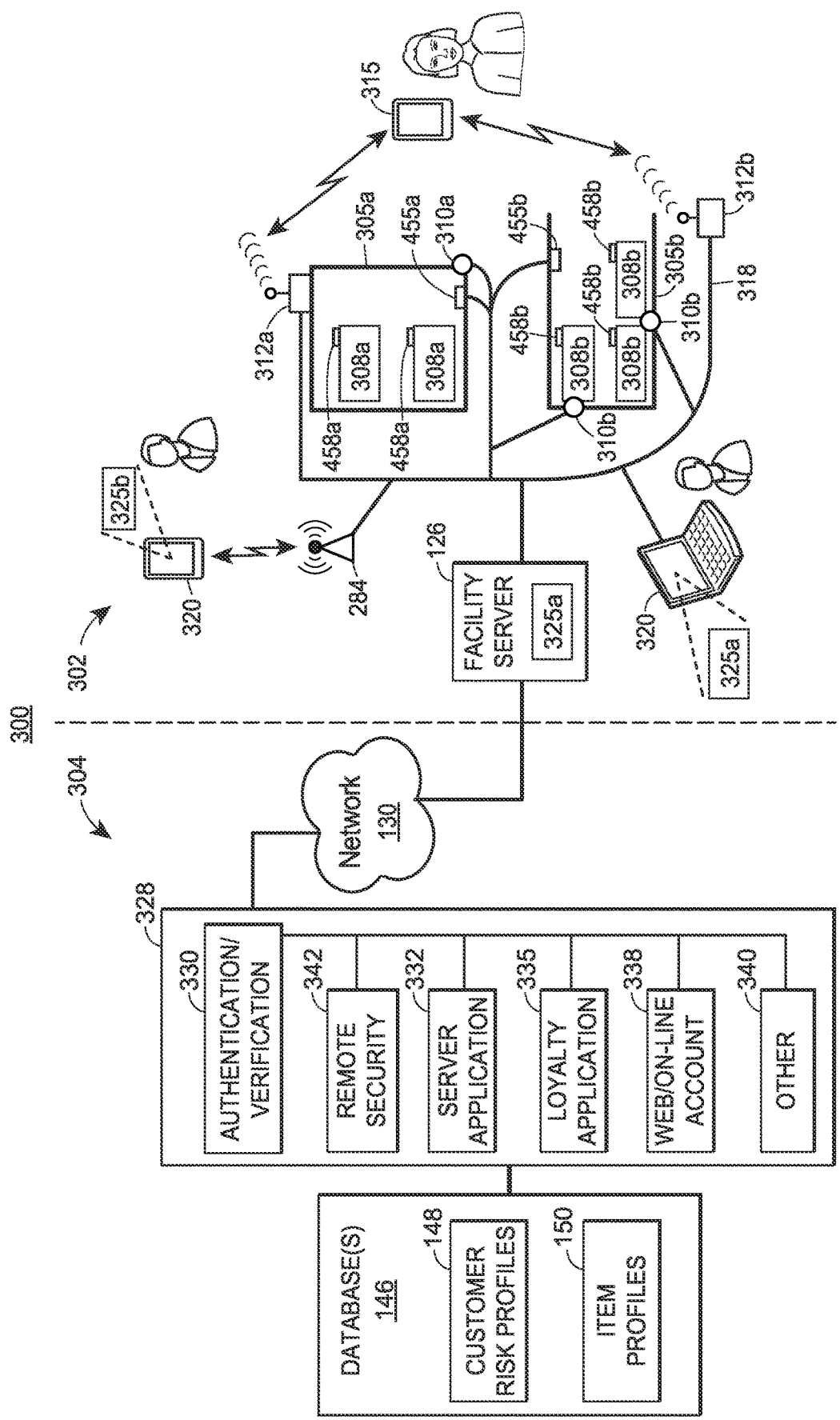
FIG. 3 depicts an example portion of the system of FIG. 1 in greater detail.

FIG. 3 depicts an example portion 300 of the system 100 of FIG. 1 in greater detail. The portion 300 includes an area or section 302 of the example physical retail store 272 of FIG. 2 that includes therein a portion of the front end-system 102 of FIG. 1. The portion 300 also includes a portion 304 of the backend system 104 of FIG. 1. The portion 300 may operate to mitigate the risk of retail theft in the physical retail store 272, for example. Thus, for ease of discussion, FIG. 3 is discussed with simultaneous reference to FIGS. 1A-1D and FIG. 2.

As illustrated in FIG. 3, the area or section 302 of the physical retail store 272 may include one or more receptacles 305, each of which respectively houses or stores one or more items 308 therein, such as retail items offered for sale by the retailer. The items 308 are secured within their respective receptacle 305 via an electronic lock 310 that may be electronically activated and deactivated. For example, as depicted in FIG. 3, the receptacle 305a stores one or more items 308a therein, and the receptacle 305a as a whole is secured via a single electronic lock 310a, e.g., by locking a cover, flap, slot, or door of the receptacle 305a using the electronic lock 310a. Also as illustrated in FIG. 3, the receptacle 305b stores one or more items 308b therein, however, the receptacle 305b as a whole is not secured by an electronic lock 310. Rather, each item 308b is secured to the receptacle 305b via a respective electronic lock 310b, either individually and/or in groups of items. For example, the receptacle 305b may be a shelf, rack, bin, or other type of receptacle.

Typically, the types of items 308 that are secured within or to the receptacles 305 in the retail store 272 have particular characteristics that render the items 308 as having a higher risk of being shoplifted or stolen. Such characteristics may include, for example, a relatively high value or cost, a relatively high black market or resale value or demand, a history of being shoplifted, a requirement for checking customer's age before purchase, etc.

Additionally, each receptacle 305 in the area or section 302 of the example physical retail store 272 is associated with a corresponding wireless transceiver 312. The wireless transceiver 312 may be disposed or located on or at the receptacle 305 (as is illustrated by the transceiver 312a), or the transceiver may be disposed or located proximate to the receptacle 305, e.g., within sufficient proximity of the receptacle 305 so that a mobile device 315, when operated by a customer who is in vicinity of the receptacle 305 and who may be interested in handling the items 308 stored therein, is able to detect signals generated by the wireless transceiver 312, e.g., when the customer device 315 is within the detection range of the transceiver 312 (as is illustrated by the transceiver 312b). The customer device 315 may be one of the mobile devices 206-214 or 281, 283, for example, and the wireless transceiver 312 may be one of the transmitters 285-288 which may support a short-range communication protocol such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. For example, the wireless transceiver 312 may transmit (e.g., continuously or intermittently) a beacon signal using a short-range communication protocol, or may transmit some other suitable wireless signal that is able to be detected and/or discovered by the customer device 315 when the customer device 315 is within the detection range of the wireless transceiver 312.

As further shown in FIG. 3, the transceivers 312 and the electronic locks 310 within the physical retail store 272 may be communicatively connected to the store's facility server 126, e.g., in a manner such as previously discussed with respect to FIG. 2. Typically, the transceivers 312 and the electronic locks 310 may be connected to the facility server 126 via any number of in-store wired and/or wireless network connections or network(s) 318, and the connections via which the transceivers 312 and the electronic locks 310 may be secured and are not accessible to the public. In some configurations, the transceivers 312 and/or the electronic locks 310 may be additionally or alternatively communicatively connected via the in-store network(s) 318 and one or more external networks 130 to one or more components of the backend system 104, such as to the central processing system 140.

Still further as shown in FIG. 3, one or more devices 320 that are being operated by agents of the retailer or enterprise (e.g., store associates, risk management personnel, etc.) may be communicatively connected to the in-store network(s) 318. The agent device 320 may be one of the devices 206-216 or 281, 283, for example, and may be a mobile device or may be a stationary device. As such, the agent device 320 may be communicatively connected to the facility server 126, the workstations 128, and/or to the electronic locks 310, e.g., via a wireless access point 284 or a wired connection 322, both of which may be included in the in-store network(s) 318. In some situations, multiple agent devices 320 may be communicatively connected to the in-store network(s) 318. Typically, the connections via which the agent devices 320 are connected to the in-store network(s) 318 may be secured and not accessible to the public.

To mitigate the risk of retail theft, the facility server 126 may execute thereon a local server security application 325a which, in some embodiments, includes the security module 152 of FIG. 1 or an instance thereof. In some embodiments, one or more agent devices 320 may execute thereon a respective local device security application 325b. The local server security application 325a may operate in conjunction with one or more local device security applications 325b to mitigate the risk of retail theft within the store 272. In some configurations, though, either the local server security application 325a or the local device security applications 325b may be omitted.

Now turning to the portion 304 of the backend system 104 depicted in FIG. 3, the portion 304 may include one or more applications and/or routines 328 that support the retailer or enterprise. At least some of the applications 328 may be, for example, a server application 113 or software module 171 at the central processing system 140, and/or at least some of the applications 328 may be an application or module 238 at the server 202. At any rate, the applications/routines 328 included in the portion 304 of the backend system 104 may include a customer authentication/verification module 330 that, when executed, authenticates and verifies an electronic presence of a customer, a server application 332 that operates in conjunction with client applications 118 that are provided by the retailer enterprise and downloaded to various customer devices 315, an application that manages a loyalty card or incentive program 335 provided by the retailer or enterprise, an application that manages an electronic or web-based account of customers of the retailer or enterprise 338, and/or other applications/routines 340.

As further illustrated in FIG. 3, the application/routines 328 may have access to at least a portion of the data stored in the database(s) 146. For example, the loyalty program application 335 may access data indicative transactions and rewards that have been issued to customers, and the electronic customer account application 338 may access stored credit card information.

To mitigate the risk of retail theft, the applications/routines 328 may include a remote security application 342. In an embodiment, the remote security application 342 includes an instance of the security module 152 of FIG. 1. In some embodiments, the remote security application 342 may be integrally implemented with one or more other applications 328, such as with the customer authentication and verification application 330 or the server application 332. The remote security application 342 may operate in conjunction with the local security application(s) 342 and may access data stored in the customer risk profile store 148 and optionally data stored in the item profile store 150 to utilize in mitigating the risk of retail theft, which may include the remote triggering of secured receptacles, as is described below.

Figure 4:
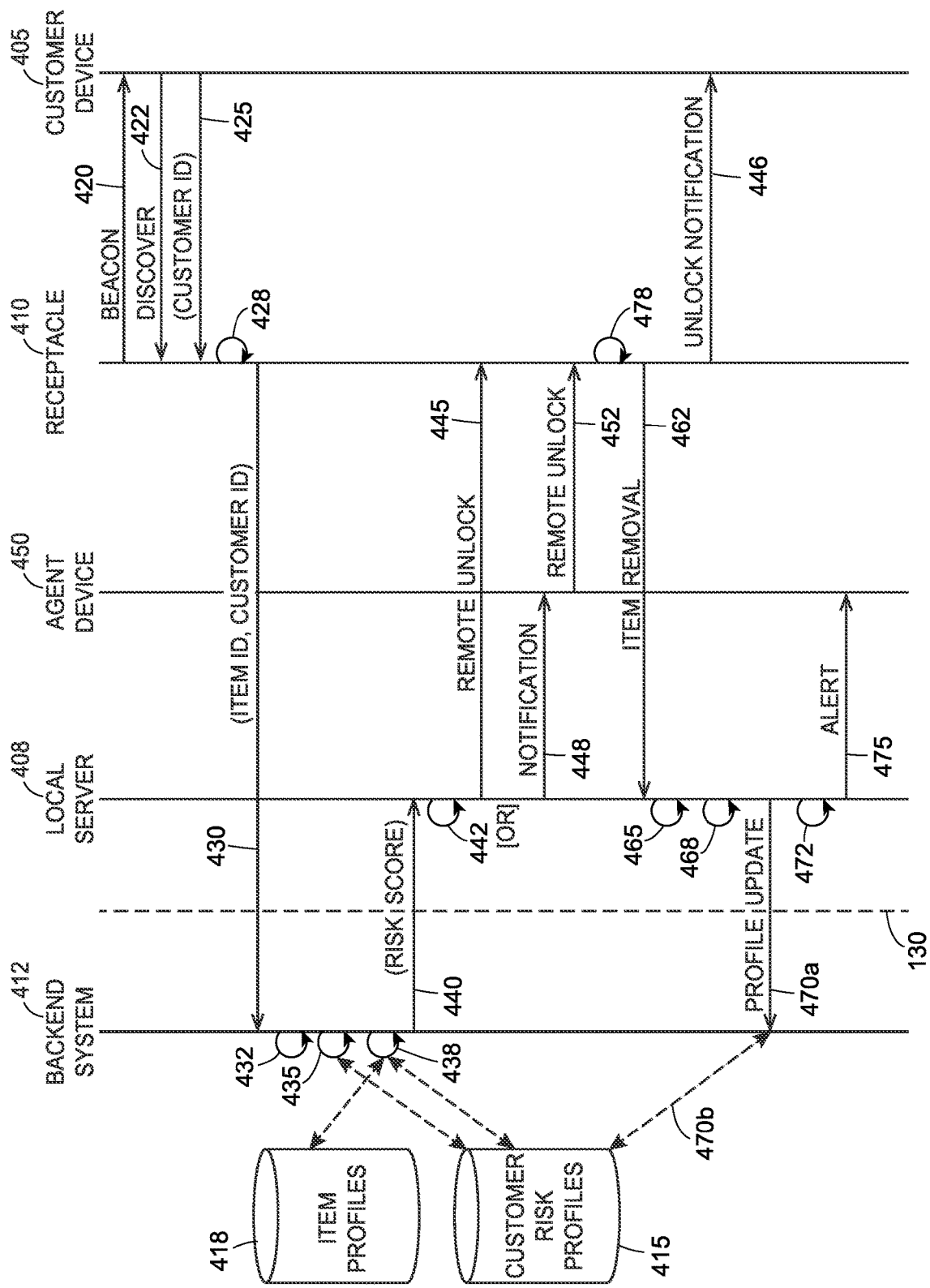
FIG. 4 illustrates an example signal diagram associated with mitigating the risk of retail theft at a physical store of a retailer or enterprise which, inter alia, includes an example signal flow for remotely unlocking a secured receptacle.

Specifically, FIG. 4 depicts an example signal diagram 400 associated with mitigating the risk of retail theft at a physical store of a retailer or enterprise, e.g., by automatically triggering the unlocking or un-securing of items for particular customers. For ease of discussion, and not for limitation purposes, FIG. 4 is discussed with simultaneous reference to FIGS. 1A-1D, FIG. 2, and FIG. 3, although the signal diagram 400 of FIG. 4 may be utilized with other systems and other computing devices.

The signal diagram 400 indicates a personal electronic device (PED) 405 and a server 408. A user or customer of a retailer may operate the personal electronic device 405, for example, and the device 405 may be a smart phone, tablet, laptop, or other PED that is configured with wireless capabilities. For example, the personal electronic device 405 may be one of the devices 206-214 of FIGS. 1A and 1B. The server 408 may comprise one or more of the frontend components 102 of the retailer. For example, the server 408 may include a facility server 126 and/or one or more workstations 128.

The signal diagram 400 also indicates a receptacle 410 disposed within a physical retail store, into or in which one or more items are secured via one or more electronic locks. For example, the receptacle 410 may be one of the receptacles 305 storing one or more items 308 that are secured via one or more electronic locks 310, as illustrated in FIG. 3. Additionally, the receptacle 410 may include a transmitter and/or a transceiver disposed thereon, or within sufficient proximity of the receptacle 410 so that the PED 405, when operated by a customer who may be interested in handling the items stored within the receptacle 410 and is in the vicinity of the receptacle 410, is able to detect signals generated by the transceiver/transmitter. The transmitter and/or transceiver associated with the receptacle 410 may be the transceiver 312 illustrated in FIG. 3, in an embodiment.

Additionally, the signal diagram 400 indicates a backend system 412. In an embodiment, the backend system 412 is the back end portion 104 of the system 100 shown in FIG. 1A, and as such may include the central processing system 140 and/or the server 202. At any rate, FIG. 4 illustrates a database or data store 415 in which customer risk profiles are maintained, and a database or data store 418 in which item profiles are maintained. The data stores 415, 418 may be included in the backend system 412, or the data stores 415, 418 may be excluded from but nonetheless accessible to the backend system 412. In an embodiment, the data store 415 comprises the risk profile store 148 of FIG. 1A, and the data store 418 comprises the item profile store 150 of FIG. 1A.

The transceiver associated with the receptacle 410 may emit a beacon signal 420, and when the PED 405 is disposed within the detection range of the transceiver, the PED 405 may automatically detect the beacon and thereby discover the transceiver associated with the receptacle 410 (reference 422), thereby establishing a wireless communication connection between the PED 405 and transceiver associated with the receptacle 410. In some embodiments, the wireless connection may be automatically established, that is, the user of the PED 405 may not have initiated the discovery process and indeed, may be unaware of the discovery process.

In some embodiments, though, the establishment of the wireless connection between the PED 405 and the transceiver associated with the receptacle 410 may be triggered by the user of the PED 405. For example, the user may wish to access the items secured at the receptacle 410, and may utilize an application executing on the device 405 to trigger the unlocking or un-securing of the items. The application may be an application 118 that is provided by the retailer or enterprise, e.g., a retailer client application, a loyalty card client application, etc. Alternatively, the application may be a web browser or equivalent via which the user accesses his or her electronic or web-based account with the retailer or enterprise. At any rate, via the application executing on the Personal Electronic Device 405, the user may activate a user control thereby initiating the discovery of the transceiver corresponding to the receptacle 410 (reference 422), and the eventual establishment of the wireless connection between the PED 405 and the transceiver corresponding to the receptacle 410.

Via the established wireless connection between the PED 405 and the transceiver associated with the receptacle 410, the PED 405 may transmit or send an indication of an identity of a user or customer (reference 425). The indication of the customer identity may comprise, for example, an identifier of the personal electronic device 405, such as an International Mobile Station Equipment Identity (IMEI), a Mobile Equipment Identifier (MEI D), an International Mobile Subscriber Identity (IMSI), an Electronic Serial Number (ESN), an integrated circuit card identifier (ICC-ID) of a card or chip of the PED 405, a Telephone Number (TN), and/or other suitable identifier. Such types of identifiers may be automatically transmitted or sent from the PED 405 to the transceiver corresponding to the receptacle 410 upon establishment of the wireless connection, e.g., as part of the header and/or payload in the signaling that is exchanged to establish the wireless connection. In these situations, the communication 425 may be omitted, as the indication of the customer identity is included in the communication 422.

In some scenarios, the indication of the customer identity may comprise an identification of an account of the customer with the retailer or enterprise (e.g., a loyalty account, an electronic or web-based account, etc.), and/or of a user ID or login ID associated therewith. In some scenarios, such as when a retailer client application is executing on the PED 405, the indication of the customer identity may comprise an identifier of the client application itself, e.g., as tracked by a server of the retailer or enterprise. At any rate, the indication of the customer identity may be automatically sent from the PED 405 to the transceiver of the receptacle 410, or may be sent upon request of the user or customer, e.g., by activating a user control at the PED 405.

Upon reception of the indication of the customer identity (reference 428), the transceiver corresponding to the receptacle 410 may cause the customer identity indication (reference 430) and optionally an indication of the type of item secured at the receptacle 410 to be transmitted or sent to the backend system 412. In the scenario illustrated in FIG. 4, the transceiver corresponding to the receptacle 410 has a priori knowledge of the types of items being secured at the receptacle 410, and sends an indication of the type of item along with the customer identity indication directly to the backend system 412 (reference 430), e.g., via the network 130. In some embodiments (not shown), the transceiver corresponding to the receptacle 410 may send an indication of the obtained customer identity information to the local server 408 servicing the particular physical retail store, and the server 408 may determine the type of item being secured at the receptacle 410 (e.g., by accessing a store plan or database that maps receptacles to items), and the server 408 may transmit or send the customer identity indication and an indication of the type of item to the back end system 412, e.g., via the network 130.

Upon reception of the customer identity indication and the indication of the type of item (reference 432), the back end server 412 may authenticate and verify the customer based on the customer identity indication (reference 435). For example, the back end server 412 may utilize the authentication and verification application 330 to verify the received customer identity indication against customer data stored in the customer risk profile database 415 (as shown in FIG. 4), or against customer data stored in some other suitable database. Using the authenticated and verified customer identity, the backend server 412 may determine a risk score corresponding to the identified customer (reference 438). The risk score may be determined (438) based on risk profile data corresponding to the customer identity and stored in the database 415. As previously discussed, the customer's risk profile may include data or information pertaining to the customer's product purchases, product returns, bounced checks, payment history, on-line browsing habits, and/or other historical actions/events that the customer has had with the retailer or enterprise. In some embodiments, the risk score of the identified customer may be determined (438) further based on item profile data corresponding to the identified item and stored in the database 418, such as data indicative of the value of the item, whether or not the item has a history of theft are being stolen, etc. Different types of customer risk profile data and/or item profile data may be weighted differently to determine the risk score, if desired. In an embodiment, the customer risk profile database 415 may comprise the customer risk profile data store 148 of FIG. 1A, and the item profile database 418 may comprise the item profile data store 150 of FIG. 1A.

The signal diagram 400 depicts the determined risk score being transmitted or sent from the back end server 412 to the local server 408 that is servicing the physical retail store in which the receptacle 410 is disposed (reference 440). At the local server 408, a determination may be made as to whether or not the risk score is indicative of an acceptable risk or of an unacceptable risk (reference 442). If the risk score is indicative of an acceptable risk, the electronic lock(s) securing the items at the receptacle 410 may be automatically and remotely unlocked. For example, the local store server 408 may send a remote unlock signal, command, or instruction 445 to the electronic lock(s) associated with the receptacle 410, e.g., via the in-store network(s) 318. A notification that the items have been remotely unsecured/unlocked may be sent to the customer device 405, e.g., by the transceiver proximate to the receptacle 410 as shown in FIG. 4, or by the local server 408 (not shown in FIG. 4). Additionally or alternatively, an indication that the items have been remotely unsecured/unlocked may be locally provided at or near the receptacle, e.g. via a light, display screen, or other indicator.

If the risk score is indicative of an unacceptable risk for an automatic unlocking of the receptacle 410, an agent of the retailer may be notified. For example, the local server 408 may transmit or send, to an agent device 450, a notification including an indication of the risk score, the receptacle 410, the item secured at the receptacle 410, the value of the item secured at the receptacle 410, and/or the electronic lock(s) associated with the receptacle 410 (reference 448). Upon reception of the notification, an agent operating the device 450 may evaluate the received information and make a decision as to whether he or she is to remotely unlock the receptacle 410 for the customer by causing a remote unlock signal, command, or instruction to be sent to the electronic lock (reference 452), or whether he or she is to physically walk over to the receptacle 410 and manually open the electronic lock(s) so that the agent may monitor customer's behavior. In an embodiment, the agent may remotely unlock the receptacle 410 by activating a user control at his or her device 450, thereby causing an unlock signal to be transmitted via the in-store network 318 to the electronic lock(s) (reference 452), and thus causing the items at the receptacle 410 to be automatically unsecured and made accessible to the customer. A notification that the items have been remotely unsecured/unlocked may be sent to the customer device 405, e.g., by the transceiver proximate to the receptacle 410 or by the agent device 450 (not shown in FIG. 4). Additionally or alternatively, an indication that the items have been remotely unsecured/unlocked may be locally provided at or near the receptacle, e.g. via a light, display screen, or other indicator.

In some configurations of the system 100, when the items at the receptacle 410 are automatically unsecured (e.g., via the remote unlock signal, command, or instruction 445 or the remote unlock signal, command, or instruction 452), a sensor disposed at the receptacle 410 may detect the removal of items (reference 460) and may indicate the occurrence or event of the removal to the local server 408 (reference 462). For example, the sensor may be an RFID (Radio-Frequency Identification) or other suitable detector that is positioned to detect a movement of a corresponding tag that is affixed to an item that is secured at the receptacle 410. For example, as shown in FIG. 3, a sensor 455a corresponding to receptacle 305a is disposed at a location that enables the sensor 455a to detect the removal of items 308a via their affixed tags 458a, and a sensor 455b corresponding to receptacle 305b is disposed at a location that enables the sensor 455b to detect the removal of items 308b via their affixed tags 458b. In FIG. 4, upon the detection of the removal of an item at the receptacle 410 (reference 460), the sensor may cause a signal indicative of the item's removal to be transmitted to the store server 126 (reference 462), e.g., via the in-store network(s) 318, so that the item may be tracked.

For example, the local server 408 may set a timer (reference 465) corresponding to when the item was removed from the receptacle 410. The server 408 may start the timer when the server 408 receives the signal 462, or the server 408 may set the timer in accordance with a timestamp included in the signal 462. The duration of the time interval for which the timer is set may be determined a priori, and the duration may be modifiable. At any rate, if the item is purchased and/or otherwise scanned at a register within the retail store before the timer expires, the server 408 may cancel the timer (reference 468) and cause the purchase and/or the scanning of the item to be reflected in the customer's risk profile stored at the database 415 (references 470a, 470b). On the other hand, if the item has not been purchased and/or otherwise scanned at any register in the retail store when the timer expires, as denoted in FIG. 4 by the reference 472, this event may be indicative of theft or some other undesirable condition relating to the removed item. Accordingly, in this situation 472, the server 408 may alert an agent of the retailer by sending an alert to the agent's device 450 (reference 475). The alert may include an indication of the removed item, the receptacle 410, the time at which the item was removed from the receptacle, and/or other data. Upon viewing the alert, the agent may take the appropriate steps to recover the item and/or prevent loss of the item.

In some scenarios, after the item and/or receptacle 410 has been remotely unlocked or unsecured, the item and/or the receptacle 410 may automatically be re-secured. For example, after reception of a remote unlock signal 445, 452, a timer may be set, and the electronic lock may automatically re-lock after the timer's expiration (reference 478). The duration of the timer may be configurable and modifiable, if desired. Additionally or alternatively, the electronic lock may automatically re-lock after the detection of the removal of an item (reference 462), and/or when instructed to do so by an agent device 450 (reference 480), e.g., upon activation of a corresponding user control at the agent device 450. In these manners, the maximum time during which an item is unsecured may be controlled to mitigate the risk of the item being shoplifted or stolen.

Figure 5A:
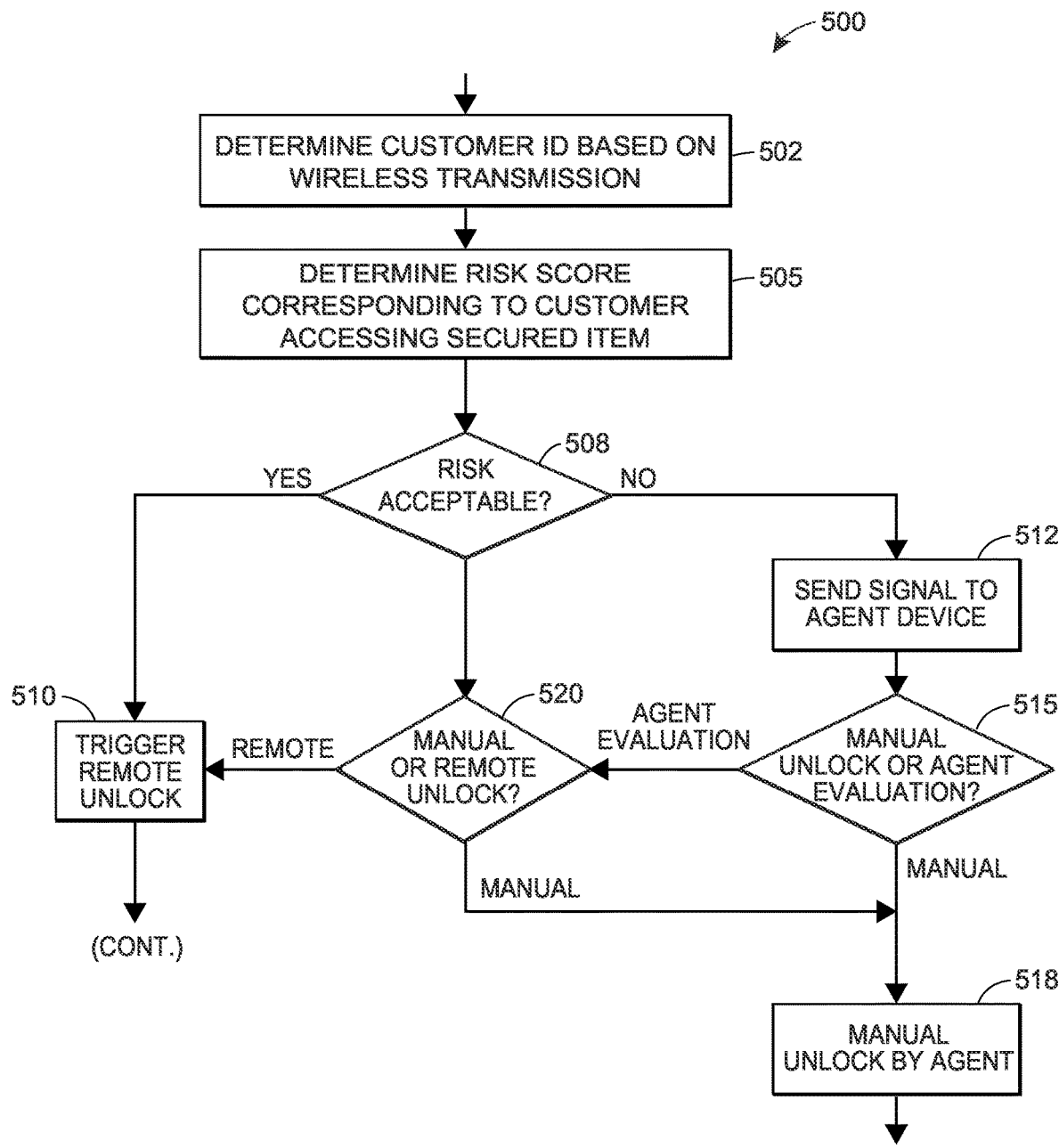
FIGS. 5A-5B illustrate a flowchart of an example method for mitigating the risk of retail theft at a physical store of a retailer or enterprise.
Figure 5B:
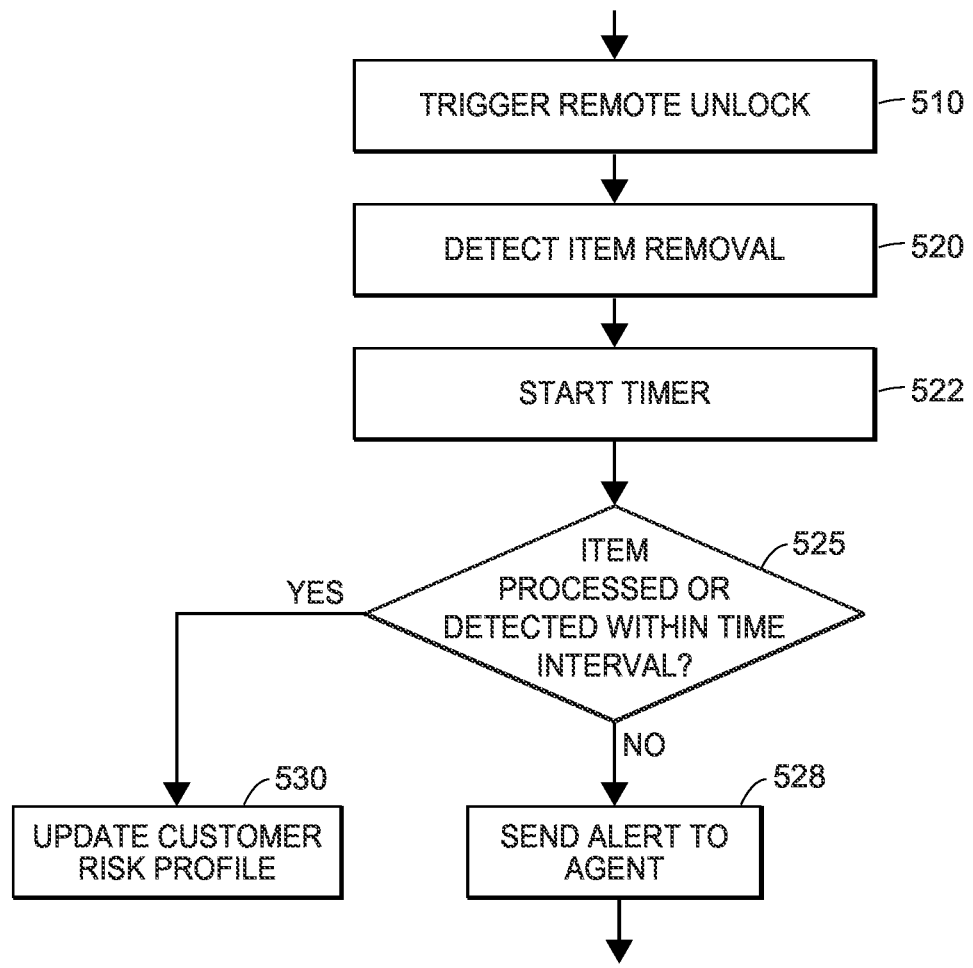

FIGS. 5A-5B illustrate a flow chart of an example method 500 of mitigating the risk of retail theft at physical retail stores of a retailer or enterprise. The method 500 may operate in conjunction with embodiments of the system 100 of FIGS. 1A-1D, the physical retail store 272 of FIG. 2, the system portion 300 of FIG. 3, the signal diagram 400 of FIG. 4, and/or other systems, stores, and/or signal diagrams. For ease of discussion, though, and not for limitation purposes, the method 500 is discussed with simultaneous reference to FIGS. 1A-1D and FIGS. 2-4.

In FIG. 5A, at a block 502, the method 500 may include determining an identity of a customer based on a wireless transmission that is delivered directly between (i) a transceiver corresponding to receptacle in or at which an item is housed and secured via an electronic lock, and (ii) a wireless electronic device, such as a customer's Personal Electronic Device, that is located within communication range of the transceiver. For example, referring to FIG. 3, the transceiver may be one of the wireless transceiver 312, and the receptacle may be one of the receptacles 305 in or at which items 308 are housed and secured via one of the electronic locks 310.

In some embodiments, determining the identity of the customer based on wireless transmission may be based on the content of the payload of the wireless transmission. In some embodiments, determining the identity of the customer based on wireless position may be based on the content of the header of the wireless transmission. At any rate, whether the customer's identity is based on the wireless transmission's payload and/or header, the identity of the customer may be determined based on an identification of the wireless electronic device, such as an NEI, and MEI D, and IMSI, and ESN, an ICC-ID of a card or chip included in the wireless electronic device, a TN, and/or another suitable identifier. Additionally or alternatively, the identity of the customer may be determined based on an identification of an account of the customer with a retailer or enterprise, such as a loyalty account, and electronic or web-based account, etc., and/or of a user ID, login ID, or other customer-specific indicia associated therewith. In some embodiments, the identity of the customer may be determined based on an identifier of the client application that is executing on the customer device, e.g. as tracked by a server of the retailer or enterprise.

At a block 505, the method 500 may include determining, based on the determined customer identity and on a risk profile of the customer, a risk score corresponding to the customer accessing the secured item. The risk profile of the customer may be stored at one or more memories or data storage devices included in a backend system of the retailer or enterprise, and may include data that is indicative of a history of unpaid items corresponding to the customer, a history of returning items corresponding to the customer, a history of non-payment or insufficient funds, history of alleged theft, etc. For example, the risk profile may be stored at the customer risk profile data store 148 illustrated in FIG. 1A.

In an embodiment, determining the risk score corresponding to the customer accessing the secured item (block 505) may be further based on an item profile of the secured item. The identity or type of the secured item may be ascertained from the wireless transmission, e.g., from contents of the payload identifying the secured item, and/or by identifying the transceiver that received the wireless transmission. The profile of the secured item may be stored at one or memories or data storage devices included in the backend system of the retailer or enterprise, and may include data that is indicative of a value of the item, a likelihood of theft of the item, a resale market or demand for the item, etc. For example, the item profile of the secured item may be stored at the item profile store 150 illustrated in FIG. 1A.

The method 500 may additionally include determining whether or not the risk score is indicative of an acceptable risk (block 508). For example, the determined risk score may be compared to a threshold to determine whether or not the risk score is indicative of an acceptable risk. At the block 508, if the risk score is determined as being indicative of an acceptable risk, the method 500 may include automatically sending an electronic signal to trigger the remote unlocking of the electronic lock at the receptacle at which the item is secured (block 510). The electronic signal may include a remote unlock command or instruction, for example, and the electronic signal may be automatically sent to the electronic lock to release the secured item (e.g., in a manner such as previously discussed with respect to the signal 445 of FIG. 4). Alternatively, an electronic signal indicating that the electronic lock may be remotely unlocked may be automatically sent to a device being operated by an agent of the retailer or enterprise, and the operating agent may cause a remote unlock signal or command to be transmitted from the agent device to the electronic lock (e.g., in a manner such as previously discussed with respect to the signal 452 of FIG. 4).

On the other hand, if at the block 508 the risk score is determined as being indicative of an unacceptable risk, the method 500 may include sending an electronic signal to a device being operated by an agent of the retailer or enterprise (block 512). The signal may include an indication that the secured item is to be manually unlocked, or that the situation requires an agent evaluation. If the signal indicates that the secured item is to be manually unlocked, e.g., as determined at the block 515, the agent may physically go to the receptacle and manually unlock the secured item so that the customer's handling of the item may be monitored in the presence of the agent (block 518).

In some scenarios, as determined at the block 515, the signal received at the agent device may indicate that an agent evaluation is needed. In this situation, the signal may include data that is indicative of the determined risk score, an indication of the identity of the customer, an indication of the item, an indication of the receptacle, etc. The agent may evaluate the received data (block 520). Based on his or her evaluation, the agent may decide to physically unlock the electronic lock so that the customer's handling of the item may be monitored in the presence of the agent (block 518), or the agent may decide to cause electronic lock to be remotely unlocked (e.g., in a manner such as previously discussed with respect to the signal 452 of FIG. 4) so that the customer has access to the secured item. For example, the agent may activate a user control at the agent device that causes an electronic signal to be sent from the agent device to trigger the remote unlocking of the electronic lock at the receptacle at which the item is secured (block 510).

Turning now to FIG. 5B, the method 500 may optionally include blocks 520-530, in some embodiments. As shown in FIG. 5B, the blocks 520-530 may be executed when a remote unlock signal is sent to the electronic lock (block 510). At the block 520, the method 500 may include determining that an item has been removed from the receptacle. This determination may be made, for example, based on a detection, by a sensor, of the movement of an electronic tag that is attached to the item, in a manner such as previously described with respect to reference 460 in FIG. 4. In an embodiment, the sensor and the electronic tag may comprise RFID technology or some other suitable sensing technology.

At the block 522, the method 500 may include starting a timer for a pre-determined time interval. The duration of the pre-determined time interval may be set a priori, and may be configurable. The start time of the pre-determined time interval may correspond to a time at which the item removal was detected (block 520) and/or may correspond to a time at which the item removal was indicated to the facility server 126, for example.

At the block 525, the method 500 may include determining whether or not the removed item has been purchased, scanned, and/or otherwise processed or detected by a workstation 128, the facility server 126, and/or some other device within the in-store network 318 within the pre-determined interval. If the removed item has not been processed or detected within the pre-determined time interval, the method 500 may include sending an alert to a device being operated by an agent of the retailer or enterprise (block 528), e.g., in a such as previously described with references 472, 475 of FIG. 4. The alert may include therein data indicative of the removed item, the time of the item's removal, the receptacle, the customer, etc. Based on the alert, the agent may take appropriate loss prevention actions. Further, the customer's risk profile may be updated to reflect the occurrence of the timer expiration (block 530).

If, at the block 525, the removed item has been processed or otherwise detected within the pre-determined time interval, the method 500 may proceed to update the risk profile of the customer accordingly (block 530).

Thus, based on the events that transpire after the removal of the item from the receptacle was detected or determined at the block 520, the customer's risk profile may be updated (block 530). The updated customer risk profile may then be utilized in determining an updated risk score corresponding to automatically triggering the remote unlocking of items for the customer in the future.

In some embodiments, at least a portion of the method 500 may be performed by one or more frontend components 102 of the system 100, and at least another portion of the method 500 may be performed by one or more backend components 104 of the system 100. In other embodiments, such as when a facility server 126 of a retail store 112 is virtually implemented external to the physical retail store 112, the entirety of the method 500 may be performed by one or more backend components 104 of the system 100 that provide a virtual facility server 126 to service the physical retail store 112.

Returning again to FIG. 3, in some scenarios, the secured receptacle 305a may be particular to a customer, and may securely house items that have been offered for sale and have been and/or are to be purchased by the particular customer. For example, the secured receptacle 305a may be designated to be unlocked by only the particular customer (or by his/her agent), e.g., to pick up an item that the customer has previously ordered, such as a filled prescription, an on-line order that is to picked up at the receptacle 305a, and the like. In these scenarios, typically the receptacle 305a is secured as a whole by a single electronic lock 310a.

Figure 6A:
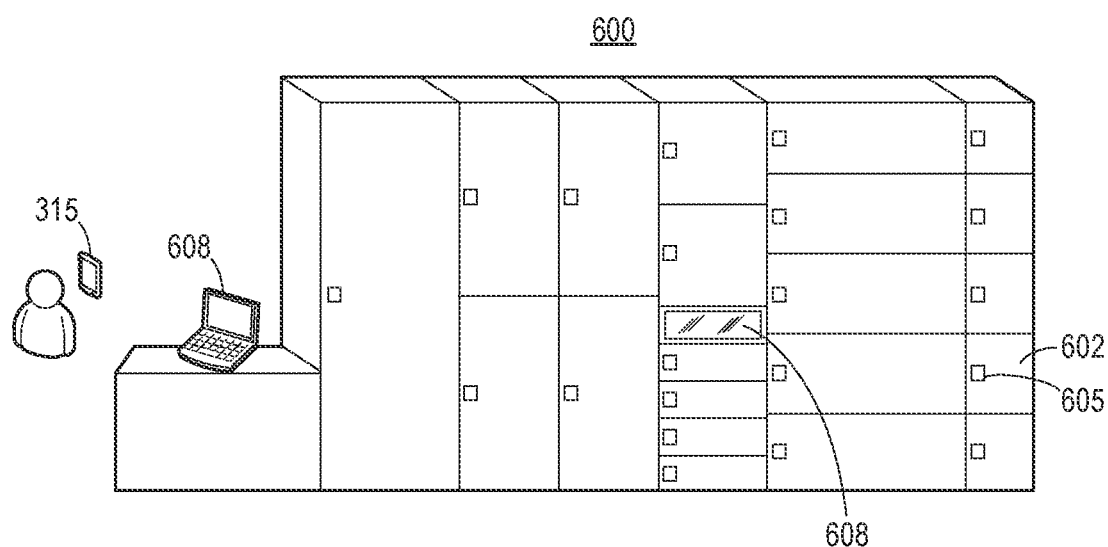
FIG. 6A illustrates an example arrangement of a plurality of receptacles, each of which is individually securable.

Indeed, referring now to FIG. 6A, the retailer or enterprise may support a plurality of receptacles 600 whose customer-facing secured access mechanisms (e.g., doors, covers, flaps, slots, etc.) are individually secured/locked. For example, the plurality of secured receptacles 600 may be a bank of lockers, cubicles, boxes, bins, cabinets, etc. of different sizes (e.g., different lengths, widths, depths), each of which may be electronically secured, e.g., in a manner similar to that described for receptacle 305a and electronic lock 310a of FIG. 3. The bank of secured receptacles 600 may be located at the physical retail store 372, or may be located at an alternate location. In some arrangements, the retailer or enterprise may support multiple banks of secured receptacles across multiple locations at which customers can access and pick up secured items. Customers may electronically gain access to a particular secured receptacle (e.g., receptacle 602 with electronic lock 605) via the customer mobile device 315, such as in a manner described above. Alternatively, customers may electronically gain access to a particular secured receptacle (e.g., receptacle 602 with electronic lock 605) via an on-site electronic device 608 corresponding to the bank of receptacles 600, or via the customer mobile device 315 operating in conjunction with the on-site receptacle management electronic device 608, as is described in more detail later in this disclosure. The on-site receptacle management electronic device 608 may be communicatively connected to each electronic lock included in the bank of receptacles 600, the facility server 126, and/or the back-end server 328 via the network 130, for example.

Figure 6B:
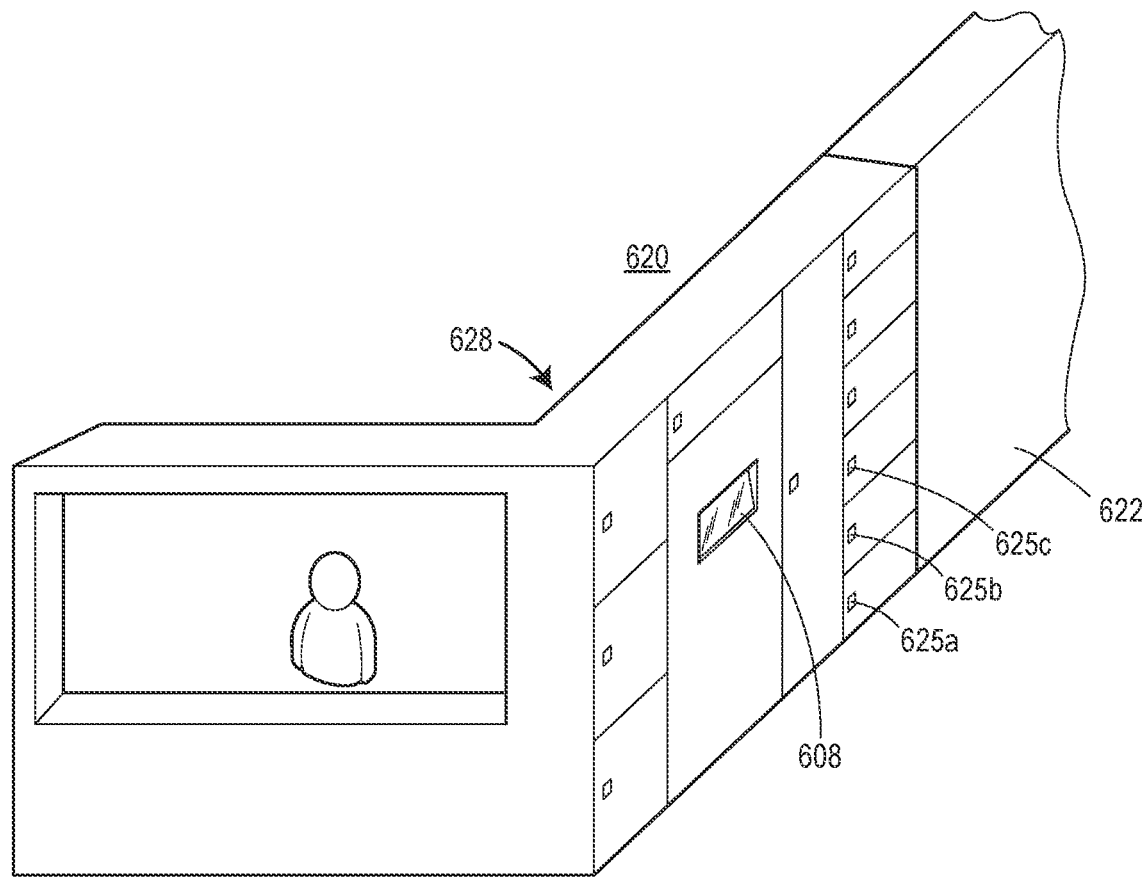
FIG. 6B illustrates another example arrangement of a plurality of receptacles, each of which is individually securable.

For retail or enterprise personnel to load and secure customer items into respective receptacles to await customer pickup, retail/enterprise personnel may unlock/access appropriate receptacles via the customer-facing access mechanisms (albeit via an enterprise mobile device using electronic security parameters that are different than those of the customer) to gain access to and load the receptacles. Additionally or alternatively, enterprise personnel may gain access to and load the receptacles via enterprise-facing access mechanisms. FIG. 6B illustrates an embodiment of the latter, in which a bank of receptacles 620 is built into a wall 622. Respective, secured customer-facing access mechanisms (e.g., 625a-625c) for each of the receptacles 620 are disposed on one side of the wall 622, and enterprise-facing access mechanisms 628 (e.g., doors, flaps, slots, covers, openings, etc., which are not visible in FIG. 6B) are disposed on the other side of the wall 622. If desired, the enterprise-facing mechanisms 628 need not be individually secured, such as when the enterprise-facing mechanisms 628 of the bank of receptacles 620 are disposed in a locked back room that is accessible to only retail/enterprise personnel and not to the public.

Figure 7:
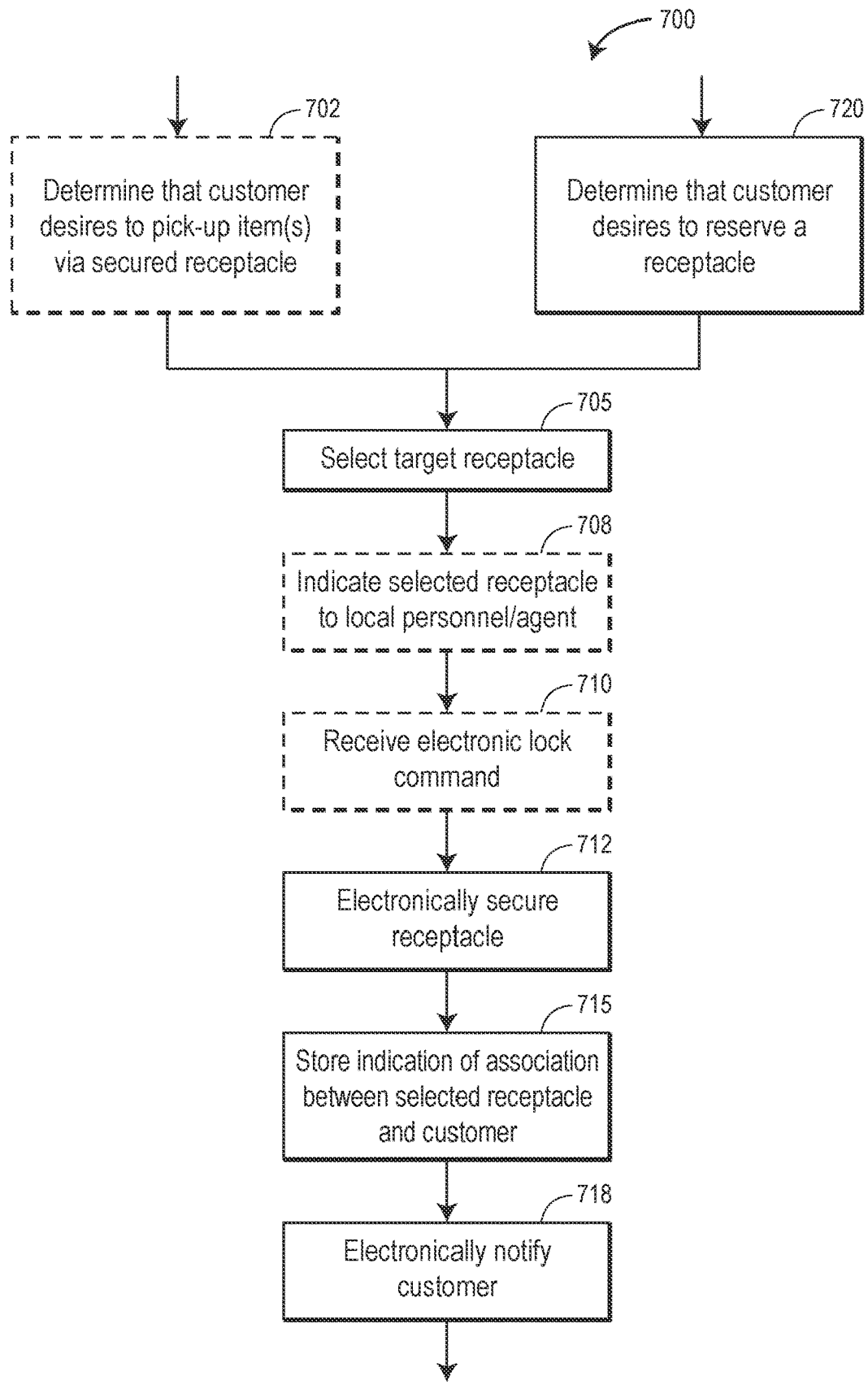
FIG. 7 depicts a flow chart of an example method of securing a receptacle.

FIG. 7 illustrates a flow chart of an example method 700 of securing a receptacle. The method 700 may operate in conjunction with embodiments of the system 100 of FIGS. 1A-1D, the physical retail store 272 of FIG. 2 or remote locations associated therewith, the system 300 of FIG. 3, the banks of receptacles 600, 620 of FIGS. 6A-6B, and/or other systems, stores, locations, and receptacles. For ease of discussion, though, and not for limitation purposes, the method 700 is discussed with simultaneous reference to FIGS. 1A-1D, 2, 3, and 6A-6B. In an embodiment, at least a portion of the method 700 is performed by executing computer-executable instructions stored on one or more memories of the central processing system 140 and/or the facility server 126. For example, instructions that are executable to perform at least a portion of the method 700 may be included in the applications/routines 325 and/or in the applications/routines 328.

FIG. 7 illustrates two of numerous example embodiments of the method 700 for securing a receptacle associated with a retailer or enterprise. In a first embodiment, at a block 702, the method 700 may include determining that a customer or user desires to pick up one or more items via a secured receptacle provided by the enterprise. The one or more items may include, for example, a prescription fill or refill, a retail item that the customer purchased on-line, a replacement item provided by the retailer or enterprise, etc. As such, determining that the customer desires to pick up one or more items via a secured receptacle (block 702) may include receiving an electronic signal including an indication of the preference of the customer/user to utilize a secured receptacle for item pick-up. For example, the electronic signal may be received from an application via which the customer/user has made a purchase and/or otherwise has designated item pick-up via secured receptacle (e.g., enterprise application 118, website, browser, etc.), or the electronic signal may be received from an agent device 320, facility server 126, and/or central processing system 140, such as when an agent of the enterprise (e.g., a pharmacist, pharmacy technician, customer service representative, etc.) indicates, e.g., via an enterprise device or user interface 320, 126, 140, that the customer/user is to pick-up item(s) via a secured receptacle.

Based on the determination that the customer/user desires to pick up one or more items via a secured receptacle (block 702), the method 700 includes automatically selecting a target receptacle (block 705), e.g., into which the one or more items are to be loaded and secured for pick-up by the customer or an authorized agent of the customer. The receptacle may be automatically selected (block 705) based on one or more preferred characteristics or conditions of receptacles that are indicated by the customer/user, e.g., a particular location of a receptacle (e.g., at a particular retail store 272, at a particular alternate location, etc.), a particular height of a receptacle from the floor (e.g., to accommodate shorter customers and/or customers seated in mobility devices), etc. Additionally or alternatively, the receptacle may be automatically selected (block 705) based on one or characteristics of the one or more items that are to be secured within the target receptacle, such as a size, dimension, and/or geometry of the one or more items (individually and/or cumulatively), temperature control requirements, etc. Still additionally or alternatively, the receptacle may be automatically selected (block 705) based on respective availabilities of different types of receptacles within one or more banks of receptacles disposed at one or more different locations, etc.

At a block 708, an indication of the selected receptacle may be delivered to an electronic device situated at the location at which the receptacle is disposed, where the electronic device is operable by or otherwise accessible to local personnel or agents of the retailer or enterprise supporting the bank of receptacles in which the selected receptacle is included. For example, at the block 708, the indication of the selected receptacle may be delivered to the facility server 126, one or more agent devices 320, the on-site receptacle management electronic device 608, and/or another computing device operated by enterprise personnel to thereby indicate that the selected receptacle is ready for receiving the customer's item(s). Based on the received indication, the enterprise personnel may manually initiate an electronic unlocking of the selected receptacle, e.g., by causing an electronic unlock command to be sent to the electronic lock securing the selected receptacle via the facility server 126, the one or more agent devices 320, the on-site receptacle management electronic device 608, and/or another computing device operated by enterprise personnel. Alternatively, the selected receptacle may be automatically unlocked by the system 100 upon its selection, and the transmitted indication of the selected receptacle to the electronic device of the local enterprise agent is for notification purposes.

Upon loading the one or more items of the customer into the selected receptacle, the enterprise personnel may issue an electronic lock instruction via the on-site receptacle management electronic device 608 or via an agent device 320 or facility server 126 that is communicatively connected to the receptacle management electronic device 608 (e.g., via one or more wired and/or wireless communication networks 318. Alternatively, the enterprise personnel may issue the electronic lock instruction directly at the electronic lock securing the selected receptacle. As such, the method 700 may include receiving the electronic lock instruction corresponding to the selected receptacle (block 710).

It is noted that the enterprise personnel receiving the indication of the selected receptacle and loading the items into the selected receptacle need not be human beings. For example, an indication of the selected receptacle may be delivered to a robot disposed at the location of the bank of receptacles, and in response to the received indication, the robot may automatically load the customer's items into the selected receptacle and issue the electronic lock command.

The method 700 may include automatically securing or locking the selected receptacle (block 712), e.g., based on the reception of the electronic locking instruction (block 710), and storing an indication of an association between the selected receptacle and the customer/user (block 715). For example, at the block 712, electronically securing the reserved receptacle may include causing an electronic signal including a lock command to be delivered to the electronic lock and, upon receiving the lock command, the electronic lock may automatically lock or secure the receptacle. At the block 715, storing the indication of the association between the selected receptacle and the customer/user may include storing the association at the product/customer database 146, and/or at a facility server 126. In some embodiments, other information may be stored in conjunction with the association, such as an indication of the identity of the customer, an indication of the identity of an agent of the customer who is authorized to pick up the items on behalf of the customer, an access or security code that is to be utilized to access the secured receptacle, etc.

Additionally, the method 700 may include automatically sending an electronic notification to the customer (block 718), where the notification may indicate that his or her secured item(s) are ready to be picked up. For example, at the block 718, the electronic notification may be delivered to the customer or to an application that corresponds to the customer (e.g., via email, text message, enterprise client application 118, etc.) and that executes at one or more PEDs 206, 208, 210, 212, 214, 216 associated with the customer. The electronic notification typically may include the physical location of receptacle (e.g., at a particular physical store or at some other location at which the receptacle is disposed), but may or may not include the specific identity of the receptacle itself. In some implementations, the notification may include an access code via which the customer is able to access the secured receptacle. The access code may be, for example, a series of alphanumeric characters, a QR code, a bar code, etc.

In a second embodiment of securing a receptacle illustrated in FIG. 7, the method 700 includes determining that a customer or user desires to reserve a securable receptacle (block 720), e.g., for returning or otherwise providing an item for securing within the reserved receptacle. For example, the customer or user may desire to reserve a receptacle provided by the retailer or enterprise to return or exchange a previously purchased item, or the customer/user may desire to reserve a receptacle provided by the retailer or enterprise via which the customer/user may securely deliver or provide one or more items for other purposes. As such, determining that the customer/user desires to reserve a securable receptacle (block 720) may include receiving an electronic signal including an indication of a request of the customer/user to reserve a receptacle that is securable. For example, electronic signal may be received from a website, browser, email, enterprise application 118, or other application executing at a customer PED 206, 208, 210, 212, 214, 216.

Based on the determination that the customer desires to reserve a securable receptacle (block 720), the method 750 may include selecting a target receptacle from a plurality of receptacles (block 705), e.g., for reservation and into which the customer may load and secure one or more items. The target receptacle may be automatically selected (block 705) based on one or more conditions. For example, the target receptacle may be automatically selected (block 705) based on one or more preferred characteristics or conditions of receptacles that are indicated by the customer/user, e.g., a particular receptacle location (e.g., at a particular retail store 272, at a particular alternate location, etc.), a maximum distance or height from the floor (e.g., to accommodate shorter customers and/or customers seated in mobility devices), a minimum receptacle size, dimension, and/or geometry, a temperature control requirement, and/or one or more other characteristics of receptacles. Additionally or alternatively, the target receptacle may be automatically selected (block 705) based on one or more conditions other than customer preferences, such as the availability of different types and sizes of receptacles at different locations.

Upon selection of the target receptacle (block 705), the second embodiment of the method 700 may include reserving the selected receptacle, e.g., by electronically securing the reserved receptacle (block 712), storing an indication of an association between the selected receptacle and the customer/user (block 715), and electronically notifying the customer/user (block 718), e.g., that a receptacle has been reserved and secured based on the reservation request. For example, at the block 712, electronically securing the reserved receptacle may include causing an electronic signal including an electronic lock command to be delivered to the electronic lock and, upon receiving the lock command, the electronic lock may automatically lock or secure the receptacle. At the block 715, storing the indication of the association between the selected receptacle and the customer/user may include storing the association at the product/customer database 146, and/or at a facility server 126. In some embodiments, other information may be stored in conjunction with the association, such as an indication of the identity of the customer, the identity of an agent of the customer who is authorized to pick up the items on behalf of the customer, an access or security code that is to be utilized to access the secured receptacle, etc.

At the block 718, electronically notifying the customer/user of the reserved, secured receptacle may include transmitting an electronic notification (e.g., via one or more communication networks 318, 130) to an electronic device and/or an application corresponding to the customer, where the electronic notification includes an indication that a receptacle has been reserved in response to the reservation request. For example, such an electronic notification may be delivered to one or more PEDs 206, 208, 210, 212, 214, 216 associated with the customer/user via email, text message, enterprise client application 118, etc. In some implementations, the notification may include an indication of the physical store or other location at which the reserved receptacle is disposed, and optionally may include an access code which the customer (or an authorized agent of the customer) may utilize to gain access to the secured receptacle. The access code may be of any suitable format, such as a series of alphanumeric characters, a QR code, a bar code, etc. The electronic notification may or may not include the specific identity of the receptacle itself.

Note that the first and second embodiments of the method 700 for securing a receptacle share common blocks. However, the first embodiment omits the block 720, whereas the second embodiment omits the blocks 702, 708, and 710. Of course, other embodiments of the method 700 are possible, which may include fewer, additional, and/or alternative blocks other than those illustrated in FIG. 7.

Figure 8:
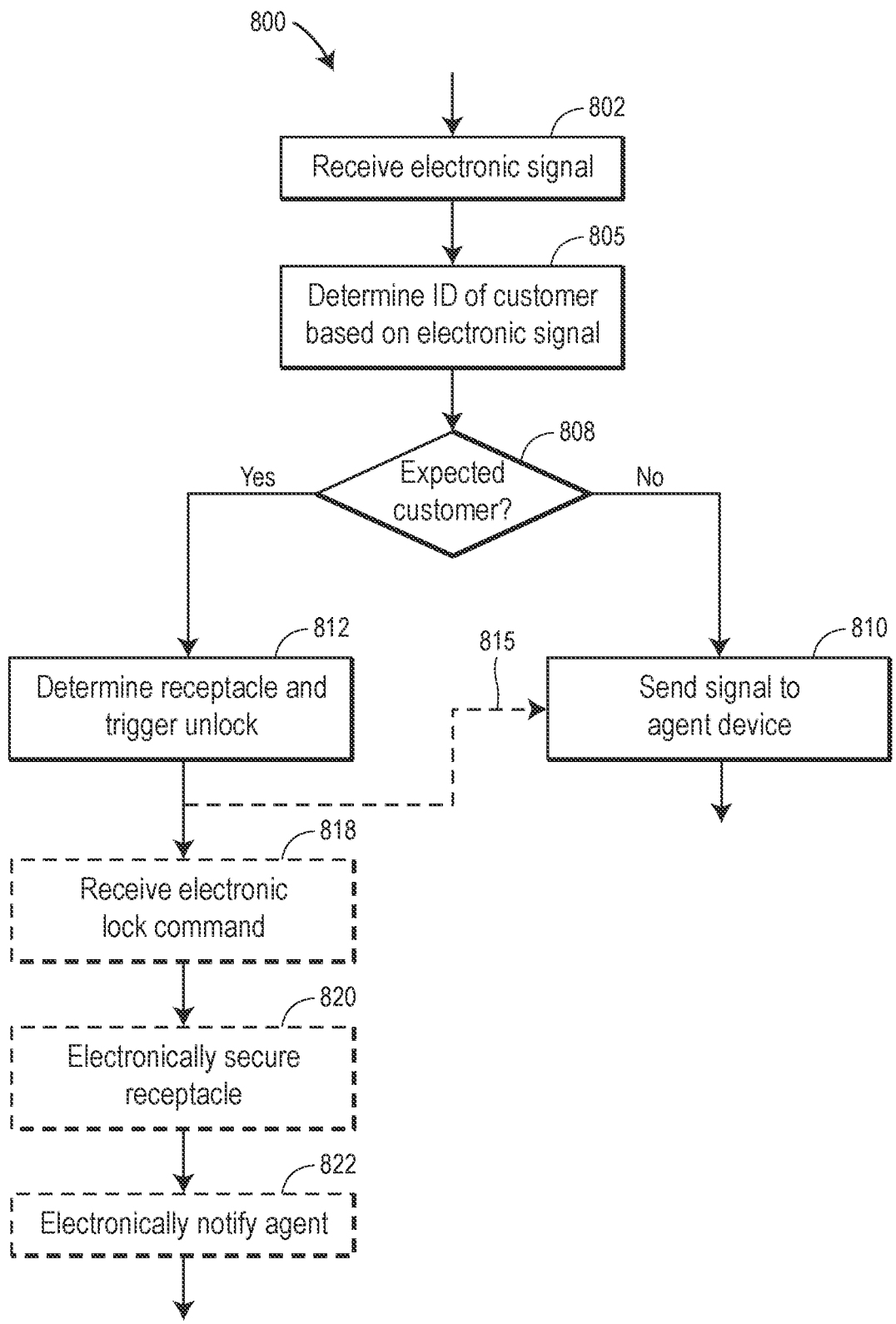
FIG. 8 depicts a flow chart of an example method of providing access to a secured receptacle.

FIG. 8 illustrates a flow chart of an example method 800 of providing access to a secured receptacle associated with a retailer or enterprise. The method 800 may operate in conjunction with embodiments of the system 100 of FIGS. 1A-1D, the physical retail store 272 of FIG. 2 and/or remote locations associated therewith, the system 300 of FIG. 3, the signal diagram 400 of FIG. 4, the banks of receptacles 600, 620 of FIG. 6A-6B, the method 700 of FIG. 7, and/or other systems, stores, locations, signal diagrams, receptacles and methods. For example, the method 800 may be performed after or subsequent to a completion of an execution of the method 700. For ease of discussion, though, and not for limitation purposes, the method 800 is discussed with simultaneous reference to FIGS. 1A-1D, FIGS. 2-4, 6A-6B, and 7. Generally speaking, the method 800 may be performed when a customer or user (or an agent of the customer/user) arrives at a location at which a secured receptacle is situated, e.g., the customer/user arrives at the receptacle bank 600 or 620.

As shown in FIG. 8, the method 800 may include receiving an electronic signal (block 802) and determining an identity of the customer based on the received electronic signal (block 805). The electronic signal may be received via a local interface of the system 100, that is, via an interface of the system 100 that is locally disposed at a location in which receptacles are situated. For example, the local interface may be included in the on-site receptacle management device 608 or in the customer PED 315.

In an example scenario, receiving the electronic signal (block 802) may include, for example, receiving an access code which was previously provided to the customer (e.g., such as at the block 718 of the method 700). The access code may be received via the on-site receptacle management electronic device 608, for example, either manually via direct entry at a manual user interface of the device 608, or optically, such as by the customer scanning a QR code, bar code, or other type of electronic code at a scanner interface of the device 608. The customer may provide the electronic code for scanning via a personal electronic device 315, via paper, or via some other suitable medium. In this example scenario, determining the identity of the customer based on the electronic signal (block 802) may include verifying that the access code is a valid access code, and optionally that the access code corresponds to a secured receptacle situated at the location.

In another example scenario, receiving the electronic signal (block 802) includes receiving biometric information, such as a fingerprint or facial scan that is received at a scanning or camera interface of the on-site receptacle management electronic device 608. Accordingly, in this example scenario, determining the identity of the customer based on the received electronic signal (block 805) may include processing the biometric information and comparing the processed biometric information to stored biometric information.

In yet another example scenario, receiving the electronic signal (block 802) includes receiving a wireless transmission that is delivered directly between (i) a transceiver of the system 100 corresponding to receptacle, and (ii) a transceiver interface of a wireless electronic device that is located within wireless communication range of the transceiver corresponding to the receptacle, such as the customer's personal electronic device 315. The transceiver corresponding to the receptacle may be a wireless transceiver that is disposed at the bank of receptacles 600 and that is communicatively coupled to the on-site receptacle management electronic device 608, and optionally to the facility server 126 and/or the central processing system 140. In some arrangements, each secured receptacle within the bank 600 may have its own respective wireless transceiver that is locally disposed at the receptacle, such as the wireless transceiver 312a corresponding to and disposed at receptacle 305a shown in FIG. 3. In some arrangements, a single wireless transceiver of the system 100 (not shown) may service multiple receptacles included in the bank of receptacles 600. For example, a single wireless transceiver of the system 100 may be disposed proximate to or at the bank of receptacles 600 and may communicate with customer PEDs 315, enterprise agent devices 320, and other devices on behalf of any receptacle included in the bank 600.

In this example scenario, determining the identity of the customer (block 805) based on the received wireless transmission may be similar to that described previously with respect to block 502 of FIG. 5A. For instance, determining the customer's identity 805 may be based on the received wireless transmission's payload and/or header, an identification of the wireless electronic device (such as an IMEI, and MEI D, and IMSI, and ESN, an ICC-ID of a card or chip included in the wireless electronic device, a TN, and/or another suitable identifier), an identification of an account of the customer with a retailer or enterprise, such as a loyalty account, an electronic or web-based account, etc., and/or of a user ID, login ID, or other customer-specific indicia associated therewith. In some embodiments, the identity of the customer may be determined based on an identifier of the client application 118 that is executing on the customer device 315, e.g. as tracked by a server of the retailer 126 or enterprise 140.

At a block 808, the method 800 may include determining whether or not the identified customer is an expected customer. For example, one or more stored associations between secured receptacles and customer/users may be accessed to determine whether or not the identified customer is associated with a secured receptacle disposed at the location. If the customer is determined to be an unexpected customer (e.g., the "no" leg of block 808), the method 800 may include sending an electronic signal to a device 320 being operated by an agent of the retailer or enterprise (block 810) to mitigate the situation. For example, the signal sent to the agent device (block 810) may include an indication that the secured receptacle is to be manually unlocked, or that the situation requires an agent evaluation. Based on the signal, the agent may physically (or virtually, such as via a remote feed) dialog with the customer to resolve the situation, which may result in the agent manually unlocking the secured receptacle or remotely triggering an electronic unlocking of the secured receptacle, in some cases.

At the block 808, if the customer is determined to be an expected customer (e.g., the "yes" leg of block 808), the method 800 may include automatically determining the corresponding receptacle and sending an electronic signal to trigger the unlocking of the electronic lock at the secured receptacle (block 812). For example, automatically determining the receptacle corresponding to the identified, expected customer may include accessing a stored indication of an association between the identified, expected customer and a particular secured receptacle. The electronic signal sent to the electronic lock of the secured receptacle corresponding to the identified, expected customer may include an electronic unlock command or instruction, for example, and the electronic signal may be automatically sent to the electronic lock to unlock the secured receptacle (e.g., in a manner such as previously discussed with respect to the signal 445 of FIG. 4). Alternatively, an electronic signal indicating that the electronic lock may be remotely unlocked may be automatically sent to a device being operated by an agent of the retailer or enterprise, and the operating agent may cause a remote unlock signal or command to be transmitted from the agent device to the electronic lock (e.g., in a manner such as previously discussed with respect to the signal 452 of FIG. 4), to thereby unlock the receptacle so that the customer is able to access the receptacle.

Further, at any time during the unlocking and accessing of the reserved receptacle (e.g., after the execution of the block 812), should the customer require assistance, the customer may electronically request the physical and/or virtual assistance of enterprise agents and/or personnel, as indicated by the reference 815. For example, the customer may request assistance (reference 815) via the customer's PED 315 and/or via the on-site receptacle management device 805, which may result in the method 800 sending an electronic signal to a device 320 being operated by an agent of the enterprise (block 810) to notify the agent that customer assistance has been requested.

Returning now to block 812, in scenarios in which access to the secured receptacle is provided for the purposes of customer item pickup, upon execution of the block 810, the method 800 may include the blocks 520-530 of FIG. 5B, e.g., to determine and/or verify that the items secured within the receptacle were indeed removed.

At the block 812, in scenarios in which access to the secured receptacle is provided for the purposes of the customer loading one or more items into the receptacle, after triggering the unlocking of the reserved receptacle (block 812), the customer may thereby have access to the unlocked, reserved receptacle. After the customer has finished loading the one or items into the receptacle, the customer may issue an electronic lock instruction, e.g., via the on-site receptacle management electronic device 608, via the customer's PED 315, or merely by closing the door, panel, lid, or other aperture cover of the receptacle. Accordingly, in these scenarios, the method 800 may include receiving an electronic lock instruction initiated by the customer (block 818), and automatically locking and securing the receptacle based on the reception of the received lock instruction (block 820). For example, at the block 820, an electronic locking command may be sent to the electronic lock of the reserved receptacle, thereby causing the reserved receptacle to be locked and secured.

In some scenarios, one or more sensors associated with the receptacle may detect the loading of the items into the receptacle. For example, the sensor 455*a* and/or another type of sensor disposed at the receptacle 305*a* (e.g., a weight sensor, an optical sensor, etc.) may detect the loading of items into the receptacle 305*a*, and signals generated by the sensor(s) may be utilized in determining whether or not the receptacle should be secured, whether or not the customer and/or enterprise agent should be notified, etc.

Based on the automatic securing of the receptacle (block 820), the method 800 may include automatically sending an electronic notification to an agent of the retailer or enterprise (block 822), where the notification may indicate that the customer's items have been secured within the reserved receptacle. For example, at the block 822, the electronic notification may be delivered to an agent device 320, the facility server 126, and/or the central processing system 140. At some time thereafter, enterprise personnel may access the secured receptacle to retrieve the items that have been loaded therein by the customer.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed:

1. A method of automatically securing receptacles associated with an enterprise, the method comprising:

receiving, via a local interface associated with a security system, an electronic signal, the local interface disposed at a location at which one or more receptacles of a plurality of receptacles associated with the enterprise are situated and secured by a plurality of electronic locks;

determining, by one or more processors of the security system, an identity of an agent of a customer and a particular receptacle, of the plurality of receptacles, that corresponds to the agent, the determination based on the received electronic signal and stored data that is indicative of interactions of the customer with the enterprise, and the particular receptacle including an agent-facing access mechanism and an enterprise-facing access mechanism; and transmitting, via one or more communication interfaces communicatively connecting the security system with the plurality of electronic locks, at least one of an activating instruction or a deactivating instruction to an electronic lock securing the enterprise-facing access mechanism of the particular receptacle, thereby respectively at least one of securing or unsecuring the particular receptacle.

2. The method of claim 1, wherein the electronic lock is a first electronic lock, and a second electronic lock secures the agent-facing access mechanism of the particular receptacle.

3. The method of claim 2, wherein an item corresponding to the customer has been received into the particular receptacle, and the method further comprises based on the identity of the agent, transmitting a respective deactivating instruction to the second electronic lock thereby unsecuring the agent-facing access mechanism of the particular receptacle for the agent to pick-up or retrieve the item from the particular receptacle.

4. The method of claim 3, further comprising, prior to the item being received into the receptacle, transmitting a respective activating instruction to the second electronic lock thereby securing the agent-facing access mechanism of the particular receptacle for receiving the item into the particular receptacle.

5. The method of claim 1, wherein the transmitting of the at least one of the activating instruction or the deactivating instruction to the electronic lock comprises transmitting the deactivating instruction to the electronic lock thereby unsecuring the enterprise-facing access mechanism of the particular receptacle for loading, via the enterprise-facing access mechanism, an item corresponding to the customer into the particular receptacle for pick-up or retrieval.

6. The method of claim 5, wherein the electronic lock is a first electronic lock, and the method further comprises, subsequent to the loading of the item into the particular receptacle, transmitting, based on the identity of the agent and via the one or more communication interfaces, an unlocking command to a second electronic lock securing the agent-facing access mechanism, thereby unsecuring the agent-facing access mechanism of the particular receptacle for the agent to pick-up or retrieve the item of the customer that has been received into the receptacle.

7. The method of claim 1, wherein:

the electronic lock is a first electronic lock;

the method further comprises transmitting a respective activating instruction to a second electronic lock securing the agent-facing access mechanism of the particular receptacle; and the transmitting, via the one or more communication interfaces, of the at least one of the activating instruction or the deactivating instruction to the first electronic lock securing the enterprise-facing access mechanism includes transmitting, via the one or more communication interfaces, an unlocking command to the first electronic lock, thereby unsecuring the enterprise-facing access mechanism of the particular receptacle for receiving an item corresponding to the customer into the particular receptacle.

8. The method of claim 7, wherein:
the receiving of the electronic signal via the local interface includes receiving the electronic signal via the local interface subsequent to a reception of the item corresponding to the customer into the particular receptacle; and
the method further comprises transmitting, based on the identity of the agent and via the one or more communication interfaces, a respective deactivating instruction to the second electronic lock thereby unsecuring the agent-facing access mechanism of the particular receptacle for the agent to pick-up or retrieve the item of the customer that has been received into the receptacle.

9. A system for automatically securing receptacles associated with an enterprise, the system comprising:
one or more communication interfaces communicatively connecting the system to a plurality of electronic locks securing a plurality of receptacles associated with the enterprise;
one or more processors; and
one or more tangible, non-transitory computer-readable media storing a set of computer-readable instructions that, when executed by the one or more processors, cause the system to:
receive an electronic signal via a local interface disposed at a location at which one or more receptacles of the plurality of receptacles associated with the enterprise are situated and secured by at least some of the plurality of electronic locks;
determine an identity of an agent of a customer and a particular receptacle, of the one or more receptacles, that corresponds to the agent, the determination based on the received electronic signal and stored data that is indicative of interactions of the customer with the enterprise, and the particular receptacle including an agent-facing access mechanism and an enterprise-facing access mechanism; and
transmit, via the one or more communication interfaces, at least one of an activating instruction or a deactivating instruction to an electronic lock securing the enterprise-facing access mechanism of the particular receptacle, thereby respectively at least one of securing or unsecuring the particular receptacle.

10. The system of claim 9, wherein the electronic lock is a first electronic lock, and a second electronic lock secures the agent-facing access mechanism of the particular receptacle.

11. The system of claim 10, wherein an item corresponding to the customer has been loaded into the particular receptacle for agent retrieval or pickup and, based on the identity of the agent, a respective deactivating instruction is transmitted to the second electronic lock, thereby unsecuring the agent-facing access mechanism of the particular receptacle for the agent to retrieve or pick up the item from the particular receptacle.

12. The system of claim 11, wherein prior to the reception of the electronic signal via the local interface, a respective activating instruction is transmitted to the second electronic lock thereby securing the agent-facing access mechanism of the particular receptacle.

13. The system of claim 9, wherein the transmission of the at least one of the activating instruction or the deactivating instruction to the electronic lock securing the enterprise-facing access mechanism is a transmission, prior to the reception of the electronic signal via the local interface, of the deactivating instruction to the electronic lock thereby unsecuring the enterprise-facing access mechanism of the particular receptacle for loading, via the enterprise-facing access mechanism, an item corresponding to the customer into the particular receptacle for pick-up or retrieval.

14. The system of claim 13, wherein subsequent to the loading of the item corresponding to the customer into the particular receptacle, the activating instruction is transmitted to the electronic lock thereby securing the enterprise-facing access mechanism of the particular receptacle into which the item corresponding to the customer has been loaded.

15. The system of claim 9, wherein:
the particular electronic lock is a first electronic lock;
the system further comprises a second electronic lock securing the agent-facing access mechanism of the particular receptacle;
the computer-executable instructions are further executable by the one or more processors to cause the system to transmit a respective activating instruction to the second electronic lock thereby securing the agent-facing access mechanism of the particular receptacle; and
the transmission of the at least one of the activating instruction or the deactivating instruction to the first electronic lock includes a transmission, via the one or more communication interfaces and subsequent to the transmission of the respective activating instruction to the second electronic lock of an unlocking command to the first electronic lock thereby unsecuring the enterprise-facing access mechanism of the particular receptacle for receiving an item corresponding to the customer into the particular receptacle.

16. The system of claim 9, wherein:
the particular electronic lock is a first electronic lock;
a second electronic lock secures an agent-facing access mechanism of the particular receptacle;
the computer-executable instructions are further executable by the one or more processors to cause the system to transmit a respective activating instruction to the second electronic lock prior to the reception of the electronic signal via the local interface, thereby securing the agent-facing access mechanism of the particular receptacle; and
the transmission of the at least one of the activating instruction or the deactivating instruction to the first electronic lock includes a transmission, based on the identity of the agent and via the one or more communication interfaces, of a respective deactivating instruction to the second electronic lock to thereby unsecure the agent-facing access mechanism of the particular receptacle.

17. The system of claim 16, wherein the agent-facing access mechanism is unsecured based on the identity of the agent for receiving a return of an item corresponding to the customer into the particular receptacle.

18. The system of claim 16, wherein an item corresponding to the customer has been loaded into the particular receptacle, and the agent-facing access mechanism is unsecured based on the identity of the agent for the agent to pick-up or retrieve the item from the particular receptacle.

* * * * *